(12) United States Patent
Minamigawa et al.

(10) Patent No.: US 11,668,559 B2
(45) Date of Patent: Jun. 6, 2023

(54) OPTICAL MEASUREMENT APPARATUS

(71) Applicant: Keyence Corporation, Osaka (JP)

(72) Inventors: Yoshihisa Minamigawa, Osaka (JP); Yusuke Suemura, Osaka (JP); Hideto Takei, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 66 days.

(21) Appl. No.: 17/485,673

(22) Filed: Sep. 27, 2021

(65) Prior Publication Data

US 2022/0163321 A1    May 26, 2022

(30) Foreign Application Priority Data

Nov. 20, 2020 (JP) .............................. JP2020-193509

(51) Int. Cl.
*G01B 11/25* (2006.01)
*G02B 13/22* (2006.01)

(52) U.S. Cl.
CPC ............ *G01B 11/254* (2013.01); *G02B 13/22* (2013.01)

(58) Field of Classification Search
CPC ........ G02B 7/102; G02B 7/08; G02B 6/3825; G02B 6/3866; G02B 1/041; G02B 19/0014; G02B 19/0085; G02B 6/36; G02B 6/3616; G02B 6/3644; G02B 6/3861; G02B 6/4219; G02B 7/022; G02B 5/1866; G02B 5/28; G02B 5/284; G02B 6/4228; G02B 6/4292; G02B 6/3885; G02B 7/00; G02B 7/003; G02B 1/06; G02B 13/22; G02B 23/2407; G02B 27/106; G02B 27/30; G02B 3/0006; G02B 30/27; G02B 30/30; G02B 6/3845; G02B 6/3849; G02B 6/3869; G02B 6/387; G02B 6/3879; G02B 6/3887; G02B 6/3891; G02B 6/3893; G02B 6/4204; G02B 6/43; G02B 6/4403; G02B 7/02; G02B 7/023; G02B 7/1825; G02B 13/06; G02B 17/04; G02B 2027/0118; G02B 21/34; G02B 6/1225; G02B 6/13; G02B 6/3843;

(Continued)

(56) References Cited

U.S. PATENT DOCUMENTS

| | | | |
|---|---|---|---|
| 6,700,671 B2 | 3/2004 | Akishiba | |
| 2012/0033235 A1* | 2/2012 | Leipnitz | G01B 11/272 250/234 |

FOREIGN PATENT DOCUMENTS

| | | | | |
|---|---|---|---|---|
| AT | 514188 B1 | * | 2/2015 | ............ B21D 5/006 |
| CN | 102253441 B | * | 9/2014 | |
| CN | 105806252 A | * | 7/2016 | ............ G01B 11/00 |
| CN | 106168462 A | * | 11/2016 | .......... G01B 11/272 |
| CN | 108120375 A | * | 6/2018 | |

(Continued)

*Primary Examiner* — Michael P Stafira
(74) *Attorney, Agent, or Firm* — Kilyk & Bowersox, P.L.L.C.

(57) ABSTRACT

An optical measurement apparatus performs an optical axis adjustment with respect to a reference surface and obtains high measurement accuracy. In an outer surface of a box-shaped light receiving housing, reference surfaces which become a reference at the time of placing the light receiving housing. In the light receiving housing, the light receiving side telecentric lens is mounted. An imaging element holder holding a two-dimensional imaging element is provided on an inner surface opposite to an introducing opening of the light receiving housing, and the two-dimensional imaging element is mounted in a manner of being capable of adjusting its position and posture.

19 Claims, 19 Drawing Sheets

(58) Field of Classification Search
CPC . G02B 7/021; G02B 7/04; G02B 7/10; G01B 11/026; G01B 11/007; G01B 11/24; G01B 15/08; G01B 17/08; G01B 21/047; G01B 5/012; G01B 7/012; G01B 11/14; G01B 11/02; G01B 11/08; G01B 11/12; G01B 11/2433; G01B 11/30; G01B 5/0004; G01B 11/00; G01B 11/005; G01B 11/26; G01B 11/27; G01B 2210/50; G01B 5/02; G01B 11/03; G01B 11/25; G01B 11/002; G01B 11/16; G01B 11/22; G01B 11/2425; G01B 11/2441; G01B 11/245; G01B 11/2504; G01B 11/272; G01B 11/303; G01B 21/042; G01B 3/34; G01B 5/0002; G01B 5/20; G01B 7/02; G01B 9/02; G01B 9/0205; G01B 9/0209

See application file for complete search history.

(56) References Cited

FOREIGN PATENT DOCUMENTS

| | | | | |
|---|---|---|---|---|
| EP | 3112800 A2 | * | 1/2017 | ............. G01B 11/00 |
| JP | 2006019710 A | * | 1/2006 | ............ G06T 7/0006 |
| JP | 2010190785 A | * | 9/2010 | |
| JP | 2010249604 A | * | 11/2010 | ......... G01B 11/2433 |
| JP | 20127898 A | | 1/2012 | |
| JP | 2015190869 A | * | 11/2015 | ............. G01B 11/08 |
| JP | 2019521785 A | * | 8/2019 | |
| WO | WO-0003255 A2 | * | 1/2000 | ............. B65G 47/29 |
| WO | WO-2012176623 A1 | * | 12/2012 | ......... G01B 11/2513 |

\* cited by examiner

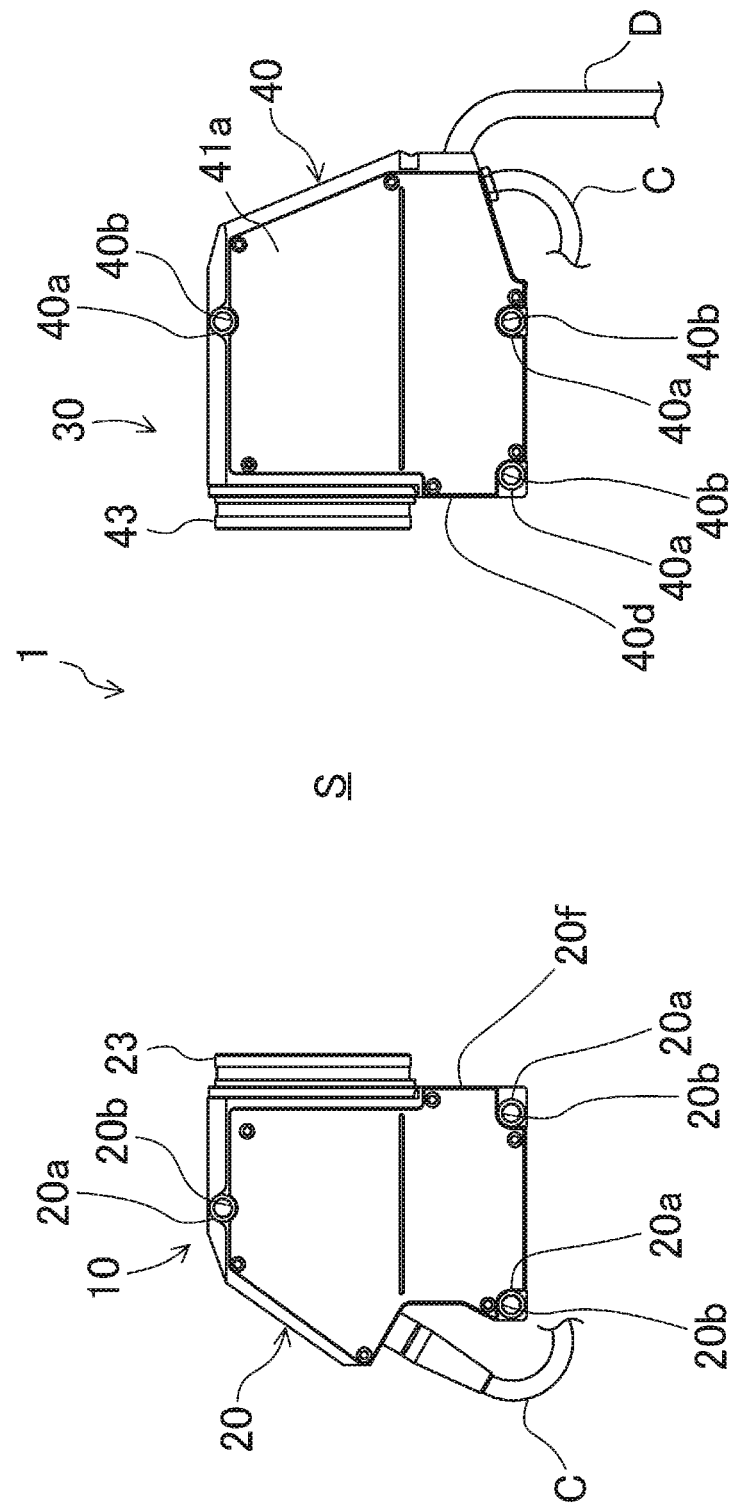

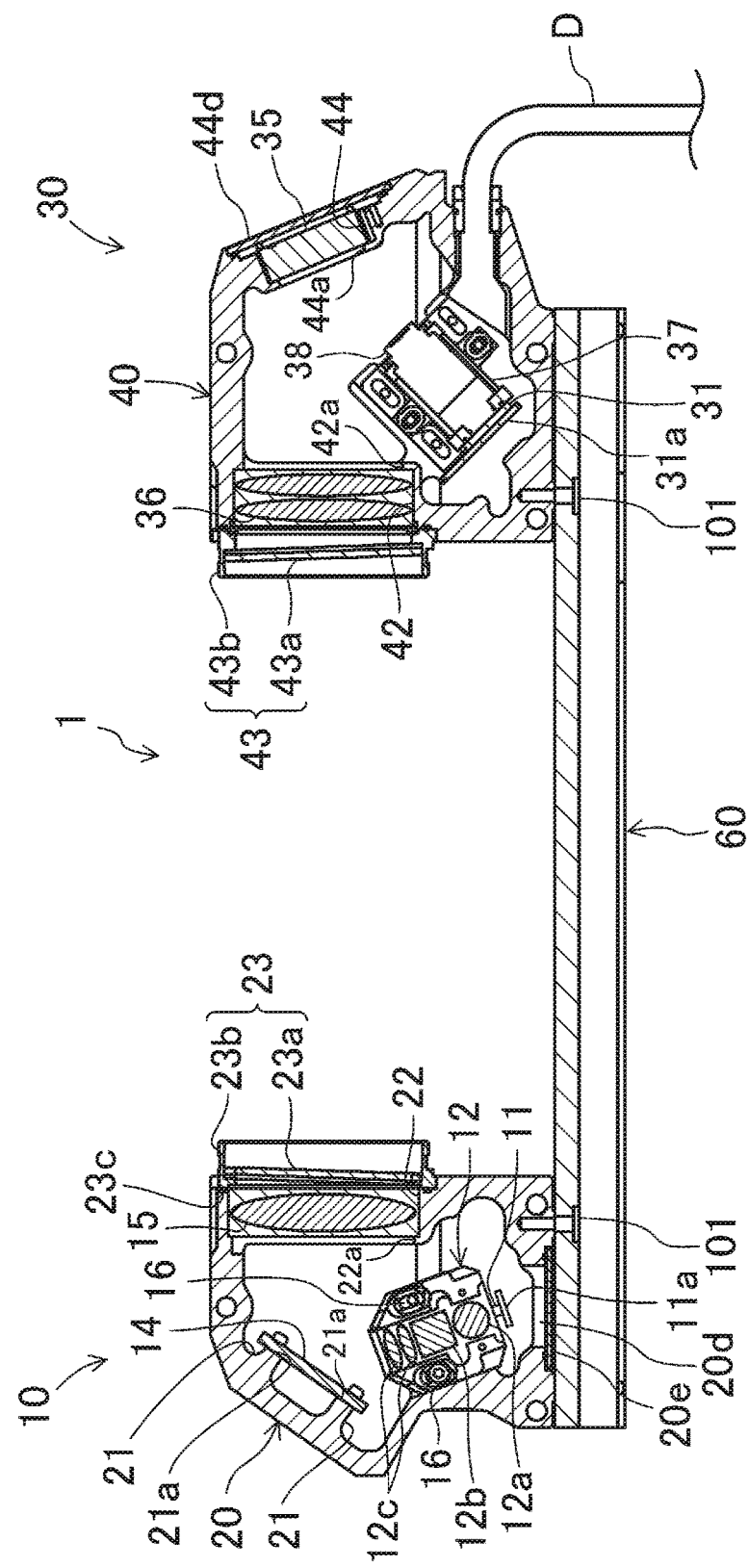

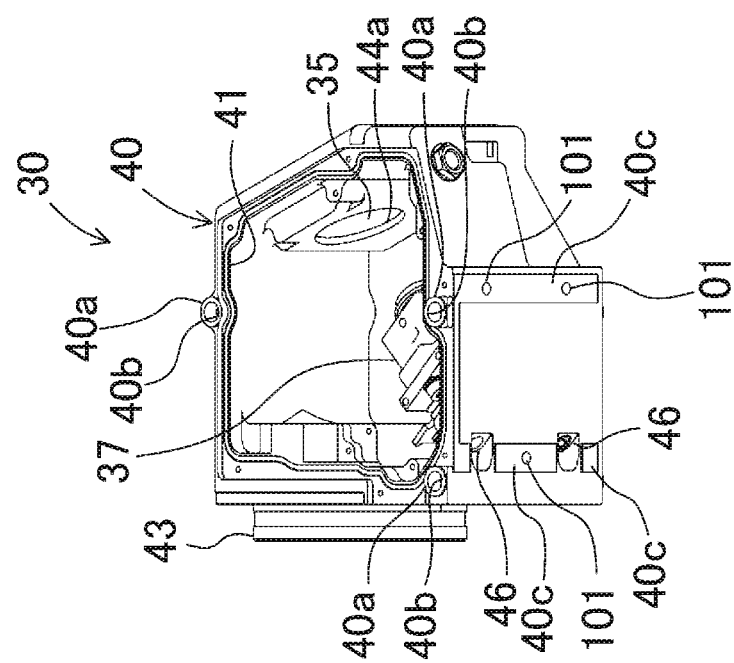
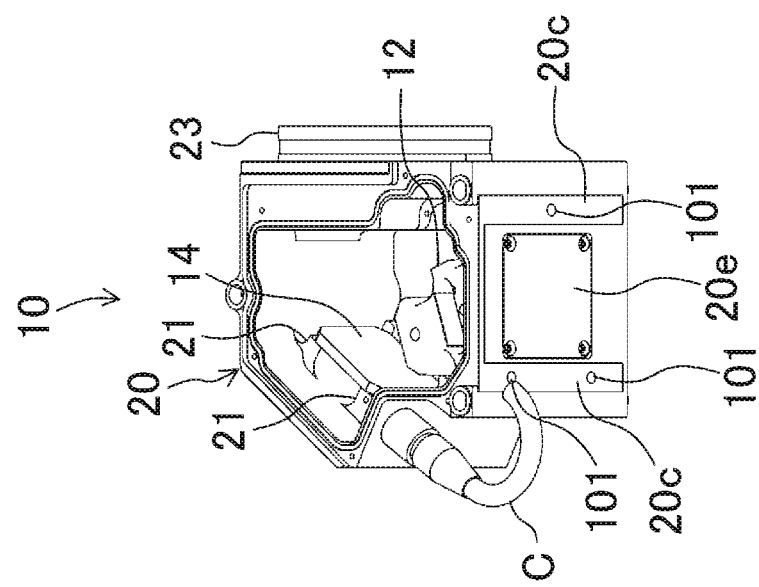
FIG.11B

OPTICAL MEASUREMENT APPARATUS

CROSS-REFERENCE TO RELATED APPLICATIONS

The present application claims foreign priority based on Japanese Patent Application No. 2020-193509, filed Nov. 20, 2020, the contents of which are incorporated herein by reference.

BACKGROUND OF THE INVENTION

Field of the Invention

The present invention relates to an optical measurement apparatus to measure a measuring object by projecting measurement light to a measurement region.

Description of the Related Art

For example, Japanese Patent Application Publication No. 2012-7898 discloses that the light irradiated from the light source is irradiated to an image sensor over the circumferential edge of the laminated substrate, and by projecting an image of the edge of the substrate to the image sensor, a position shift of two substrates can be detected. In the image sensor side, a telecentric lens is provided, and the image of the edge of the substrate is projected to the image sensor through the telecentric lens.

SUMMARY OF THE INVENTION

Note that other than the measurement of workpiece geometries, the optical measurement apparatus which images a workpiece image on an imaging face by irradiating measurement light over the workpiece from the light source to the measurement region may be used for a determination of a workpiece position, an alignment measurement, etc.

In this case, with respect to a reference surface, when an optical axis is not horizontal and vertical, the workpiece is imaged on the imaging face in the shift position of the workpiece at the time that the workpiece is moved in the optical axis direction, so that the measurement accuracy is deteriorated. Accordingly, in the aforementioned optical measurement apparatus, a structure which considers an optical axis adjustment is desired.

Taking easiness of the optical axis adjustment into consideration, a good accessibility to the optical system is important, so that in order to prioritize such good accessibility, first, the optical system is mounted to a different unit which is different from the housing, and a light emission element or an imaging element is also mounted in the different unit, and in this mounting structure, by adjusting and fixing the position or the inclination of the optical system, the light emission element, the imaging element, etc., it may be possible to perform the optical axis adjustment.

However, since the different unit is placed and assembled inside the housing in the mounting state of the optical system and the imaging element, the measurement accuracy is easily deteriorated, and after it is placed inside the housing, it is difficult to adjust the position or the inclination of the imaging element from the outside.

The present invention was made in consideration of the aforementioned circumstances. An object is to provide an optical measurement apparatus which obtains high measurement accuracy by performing an optical axis adjustment with respect to a reference surface.

In order to achieve the aforementioned object, in the 1st disclosure, an optical measurement apparatus in which a workpiece is measured by projecting measurement light to a workpiece includes a light projection unit projecting a parallel light toward a measurement region; a light receiving unit placed opposite to the light projection unit side and receiving the parallel light passing the measurement region, and generating an image of a measuring objection placed in the measurement region; and a dimension measuring means performing a dimension measurement of the measuring object based on the image generated in the light receiving unit. The light receiving unit of the optical measurement apparatus includes a light receiving side telecentric lens in which the parallel light passed through the measurement region is made incident; a two-dimensional imaging element receiving the light passed through the light receiving side telecentric lens, and capturing an image of the measuring object in the measurement region for generating an image of the measuring object in the measurement region; a light receiving housing having a box-shape in which an introducing opening is formed on one side surface and storing the two-dimensional imaging element, a reference surface as a reference when placing and a housing installation hole for placing via the reference surface being provided on an outer surface which is different from the one side surface, and the light receiving side telecentric lens being mounted on the light receiving housing; an imaging element holder holding the two-dimensional imaging element mounted in an adjustable manner of a position and a posture of the two-dimensional imaging element with respect to an inner surface opposite to the one side surface of the light receiving housing; and a cover covering (closing) the introducing opening.

In this structure, by placing the measurement region between the light projection unit and the light receiving unit, the parallel light projected to the measurement region from the light projection unit passes through the measurement region and is made incident to the light receiving side telecentric lens of the light receiving unit. The parallel light made incident to the light receiving side telecentric lens is received on the imaging face of the two-dimensional imaging element. At this time, when the workpiece is arranged in the measurement region, the image of the workpiece is captured on the imaging face of the two-dimensional imaging element, and with this, it is possible to measure the shape of the workpiece or the dimension of each part.

Further, the light receiving housing has a box-shape in which the introducing opening is formed on one side surface, and the reference surface as a reference when placing and the housing installation hole for placing via the reference surface are provided on the outer surface which is different from the one side surface. In this box-shaped light receiving housing, the light receiving side telecentric lens is mounted. And, the imaging element holder holding the two-dimensional imaging element is provided on the inner surface opposite to the one side surface of the light receiving housing, and the two-dimensional imaging element is mounted to be capable of adjusting its position and the posture. That is, in the box-shaped high rigidity light receiving housing, the reference surface or the housing installation hole is provided on the outer surface which is different from the one side surface on which the introducing opening is formed, and in such light receiving housing, the light receiving side telecentric lens is mounted. And, the two-dimensional imaging element is mounted in the adjustable manner of the position and the posture on the inner surface opposite to the one side surface. With this, the light receiving side telecentric lens is highly accurately positioned with respect to the light receiving housing, so that the high measurement accuracy is obtained, and the optical axis adjustment of the two-dimensional imaging element with respect to the reference surface can be easily performed.

In the 2nd disclosure, the two-dimensional imaging element is mounted on the inner surface of the light receiving housing via an adjusting mechanism capable of adjusting the position and the posture of the two-dimensional imaging element and the imaging element holder. The adjusting mechanism has a fixing tool switching between a fixed state in which the two-dimensional imaging element is fixed to the light receiving housing, and an unfixed state in which the two-dimensional imaging element is capable of being displaced with respect to the light receiving housing. A first access opening for accessing the fixing tool of the adjusting mechanism from an outside of the light receiving housing is formed on a surface which is different from a surface forming the introducing opening in the light receiving housing. With this, in the state in which the light receiving housing is placed, when the optical axis of the two-dimensional imaging element is shifted, the fixing tool can be operated by accessing to the fixing tool of the adjusting mechanism from the first access opening provided in the light receiving housing. By operating the fixing tool, the two-dimensional imaging element is switched to the unfixed state with respect to the light receiving housing, and the two-dimensional imaging element can be displaced. With this, the optical axis of the two-dimensional imaging element can be adjusted. After the adjustment, the two-dimensional imaging element can be the fixed state with respect to the light receiving housing by operating the fixing tool. That is, since the first access opening is formed other than the introducing opening for inserting the imaging element holder into the inside of the light receiving housing in the state of holding the two-dimensional imaging element, the optical axis adjustment of the two-dimensional imaging element in the placed state inside the housing is easily performed.

In the 3rd disclosure, the first access opening is accessibly formed to the fixing tool from a direction approximately orthogonal to an imaging face of the two-dimensional imaging element. With this, in comparison with the case of accessing the fixing tool from the side parallel to the imaging face of the two-dimensional imaging element, the two-dimensional imaging element is easily fixed to the light receiving housing.

In the 4th disclosure, a fixing member detachably fixing the light projection housing and the light receiving housing in a manner that the light projection unit and the light receiving unit are faced from each other is provided. In the fixing member, a through hole communicating the first access opening is formed at a position corresponding to the first access opening formed in the light receiving housing fixed to the fixing member. With such structure, while keeping the position of the light projection housing and the light receiving housing fixed to the fixing member, the fixing tool can be easily operated by accessing the fixing tool of the adjusting mechanism from the through hole of the fixing member and the access opening of the light receiving housing.

In the 5th disclosure, the light receiving housing further includes a receiving window on a front surface of the light receiving housing and receiving the parallel light passed through the measurement region to an inside, and the light receiving side telecentric lens is mounted in the light receiving. That is, since the light receiving side telecentric lens is a part of the box-shaped light receiving housing, and is mounted to the high rigidity light receiving window, the high measurement accuracy can be obtained.

In the 6th disclosure, since the first seat for mounting the light receiving side telecentric lens is formed in the light receiving housing, the light receiving side telecentric lens can be directly mounted to the light receiving housing, and the positioning accuracy to the light receiving housing of the light receiving side telecentric lens can be enhanced.

In the 7th disclosure, since the lens energizing member energizing the light receiving side telecentric lens in a direction pressing to the first seat is provided, the light receiving side telecentric lens is easily accurately fixed to a predetermined position of the light receiving housing. Therefore, the assembly error hardly occurs.

In the 8th disclosure, in the light receiving housing, further, a reflector for returning light passed through the light receiving side telecentric lens and guiding it to the two-dimensional imaging element is mounted, and each of the light receiving side telecentric lens and the reflector is fixedly mounted to the light receiving housing. By returning the light by the reflector, whole size of the optical measurement apparatus can be made compact. Further, by fixedly mounting both of the light receiving side telecentric lens and the reflector to the box-shaped high rigidity light receiving housing, although the optical measurement apparatus is made compact, the high measurement accuracy can be obtained.

In the 9th disclosure, since in the light receiving housing, a second seat for mounting the reflector to return the light passed through the light receiving side telecentric lens and guide it to the two-dimensional imaging element is formed, the reflector can be directly mounted to the light receiving housing, and the positioning accuracy to the light receiving housing of the reflector can be enhanced.

In the 10th disclosure, since the reflector energizing member energizing in a direction of pressing the reflector to the second seat is provided, the reflector is easily accurately fixed to the predetermined position of the light receiving housing, and the assembly error hardly occurs.

In the 11th disclosure, on a surface which is different from a surface forming the introducing opening in the light receiving housing, a reflector mounting hole fitting the reflector is formed, the second seat is configured by a projection projecting radially inward from the inner circumferential surface of the reflector mounting hole, and a cover covering the reflector mounting hole from the outside of the light receiving housing is mounted in the light receiving housing.

With such structure, it can be positioned by fitting the reflector into the reflector mounting hole by the second seat. In this state, when the cover is mounted to the receiving housing, the reflector mounting hole is covered, so that the waterproofness and the dustproofness are enhanced, and it prevents the reflector from falling off. In addition, since the second seat is configured on the surface having a predetermined area, the reflector can be fixed on the surface, and the positioning accuracy can be enhanced.

In the 12$^{th}$ disclosure, the imaging element holder has a light receiving side lens unit, which is arranged between the reflector and the two-dimensional imaging element, in which the light reflected by the reflector is made incident and the incident light is emitted to the two-dimensional imaging element, and the light receiving side telecentric lens and the light receiving side lens unit form both side telecentric optical system. With this, the uniformity to the place or the angle can be increased, and the measurement reproducibility can be improved.

In the 13th disclosure, the optical measurement apparatus includes a light projection unit projecting a parallel light toward a measurement region; a light receiving unit placed opposite to the light projection unit and receiving the parallel light passing the measurement region and generating an image of a measuring objection placed in the measurement region; and a dimension measuring means performing a dimension measurement of the measuring object based on the image generated in the light receiving unit. The light projection unit includes a light source generating the measurement light projected to the measurement region; a light projection side telecentric lens in which the measurement light generated by the light source is made incident and the measurement light is converted to the parallel light directed toward the measurement region; a light projection housing having a box-shape in which an introducing opening is formed on one side surface and storing the light source, a reference surface as a reference when placing and a housing installation hole for placing via the reference surface being provided on an outer surface which is different from the one side surface, and the light projection side telecentric lens being mounted on the light projection housing; a light source holder holding the light source mounted in an adjustable manner of a position and a posture of the light source with respect to an inner surface opposite to the one side surface of the light projection housing; and a cover closing the introducing opening. With this, the light projection side is also similar to the light receiving side, so that the high measurement accuracy is obtained by highly accurately positioning the light projection side telecentric lens, and the adjustment of the position and the posture of the light source with respect to the reference surface can be easily performed.

In the 14th disclosure, the light source is mounted on the inner surface of the light projection housing via the light source holder capable of adjusting the position and the posture of the light source, and a second access opening for accessing the light source holder from an outside of the light projection housing is formed on a surface which is different from a surface forming the introducing opening in the light projection housing. That is, by forming the second access opening on the surface different from the surface on which the introducing opening is formed in the light projection housing, in the state in which the light source holder is placed inside the housing, the adjustment of the position and the posture of the light source can be easily performed.

In the 15th disclosure, the light projection housing further includes a light projection window on the front surface of the light projection housing and passing the parallel light which is projected toward the measurement region, and the light projection side telecentric lens is mounted in the light projection window. That is, since the light projection side telecentric lens is a part of the box-shaped light projection housing, and it is mounted to the high rigidity light projection window, the high measurement accuracy can be obtained.

In the 16th disclosure, a third seat for mounting the light projection side telecentric lens is formed in the light projection housing. By forming the third seat in the light projection housing, a through hole for mounting the light projection side telecentric lens is not required in the light projection housing, so that the waterproofness and the dustproofness are enhanced.

In the 17th disclosure, a lens energizing member energizing the light projection side telecentric lens in a direction pressing to the third seat is provided. With this, the light projection side telecentric lens is easily surely fixed in a predetermined position of the light projection housing, so that the assembly error hardly occurs.

In the 18th disclosure, in the light projection housing, further, a reflector for returning the measurement light from the light source and guiding it to the light projection side telecentric lens is mounted, and each of the light projection side telecentric lens and the reflector is fixedly mounted to the light projection housing. With this, by returning the light by the reflector, while size of the optical measurement apparatus can be made compact. Further, by fixedly mounting both of the light projection side telecentric lens and the reflector in the rigidity high box-shaped light projection housing, although the optical measurement apparatus is made compact, the high measurement accuracy can be obtained.

In the 19th disclosure, in the light projection housing, a fourth seat for mounting the reflector to return the measurement light from the light source and guiding it to the light projection side telecentric lens is formed. With this, the assembly error of the reflector in the compact optical measurement apparatus can be reduced.

Effects of the Invention

As described above, the reference surface or the housing installation hole is provided on the outer surface of the high rigidity box-shaped light receiving housing, and the light receiving side telecentric lens is mounted in the high rigidity light receiving housing. And, the two-dimensional imaging element is mounted in the adjustable manner of the position and the posture. With this, the light receiving side telecentric lens is highly accurately positioned, and the high measurement accuracy is obtained, and the optical axis adjustment of the two-dimensional imaging element with respect to the reference surface can be easily performed.

BRIEF DESCRIPTION OF THE DRAWINGS

FIG. 5 is a side view showing the embodiment in which the light projection unit and the light receiving unit are placed without using the fixing member.

FIG. 6A is a vertical cross-sectional view along the optical axis in a case in which the light projection unit and the light receiving unit are used by fixing it to the fixing member.

FIG. 11B is a diagram corresponding to FIG. 11A and showing a state in which the fixing member is removed and the side surface of the light projection unit opens.

DETAILED DESCRIPTION

Hereinafter, the embodiments of the present disclosure will be described with reference to the drawings. Note that the following description of the preferred embodiments is merely for illustrative purposes and is not intended to limit the scope of the present invention, and the application or use thereof.

Figure 1:
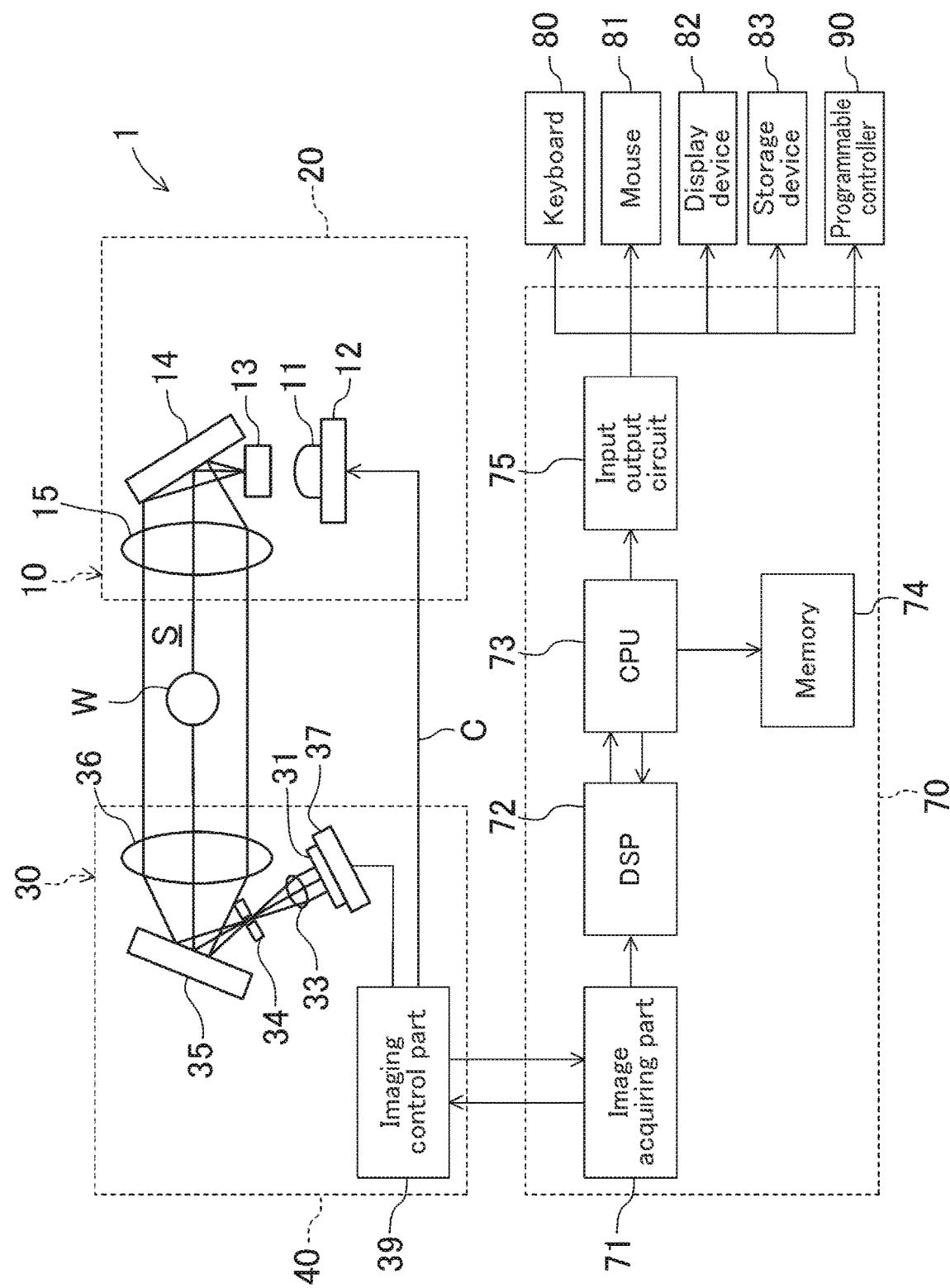
FIG. 1 is a schematic diagram of an optical measurement apparatus according to an embodiment of the present invention.

FIG. 1 schematically shows a schematic structure of an optical measurement apparatus 1 according to the embodiment of the present invention. The optical measurement apparatus 1 is a device for measuring a workpiece W which is a measuring object to be projected by measurement light, and is provided with a light projection unit 10, a light receiving unit 30, a control device 70, a keyboard 80, a mouse 81, a display device 82, and a storage device 83. Further, a programmable controller 90 is connected to the control device 70. The keyboard 80 and the mouse 81 is an example of an operation means and may be, for example, a touch panel type operation means, etc. The display device 82 is configured by, for example, a liquid crystal display, an organic EL display, etc. The storage device 83 is configured by, for example, a hard disk device, SSD (solid-state drive), etc. The programmable controller 90 is an example of an external controller which receives a predetermined control signal outputted from the control device 70 and controls various equipment connected to the outside.

The light projection unit 10 is provided with a light source 11 generating measurement light which projects to a measurement region S where a workpiece W is arranged, a light source holder 12 holding the light source 11, a diffusion means 13, a light projection side reflector 14, a light projection side telecentric lens 15, and a light projection housing 20.

The light receiving unit 30 is provided with a two-dimensional imaging element 31, an imaging element holder 37 holding the two-dimensional imaging element 31, a light receiving lens 33, a diaphragm 34, a light receiving side reflector 35, a light receiving side telecentric lens 36, an imaging control part 39, and a light receiving housing 40.

The imaging control part 39 can be provided in the light receiving unit 30, but it may be provided in the light projection unit 10.

The light projection housing 20 and the light receiving housing 40 are configured in a single member made of high rigidity metal material, and a surface which becomes various positioning references, a surface which becomes a mounting reference of each member, or a surface to which each member contacts, etc. is made by a cutting process, so that the high accuracy is secured. The surface which becomes various positioning references, the surface which becomes a mounting reference of each member, or the surface to which each member contacts, etc. may be formed by a molding.

Further, the control device 70 is provided with an image acquiring part 71, a DSP 72, a CPU 73, a memory 74, and an input output circuit 75. The control device 70 can be configured by, for example, a personal computer, etc. The data of the measurement image acquired in the image acquiring part 71 is outputted to the CPU 73 after a signal processing was performed in the DSP 72. In the CPU 73, an edge of the measurement image is extracted, and a dimension measurement is performed by using the extracted edge. The conventional well-known method can be used for the edge extraction processing of the measurement image. As the dimension measurement, it may be, for example, a distance between two edges, etc. The memory 74 includes a RAM and a ROM, and is used for storing programs for performing a predetermined function to the CPU 73, or used for temporarily storing a measurement image, a measurement result. The input output circuit 75 outputs the measurement image or the measurement result, a control signal to the outside, and is the circuit for receiving inputs of control states of the keyboard 80 or the mouse 81. The measurement image or the measurement result can be outputted from the input output circuit 75 to the storage device 83. Further, the control signal can be outputted from the input output circuit 75 to the programmable controller 90. Further, the measurement image or the measurement result can be outputted and displayed on the display device 82 with the data indicating a predetermined user interface screen. The user interface screen can be generated in the CPU 73.

(Embodiments of the Optical Measurement Apparatus 1)

Figure 2:
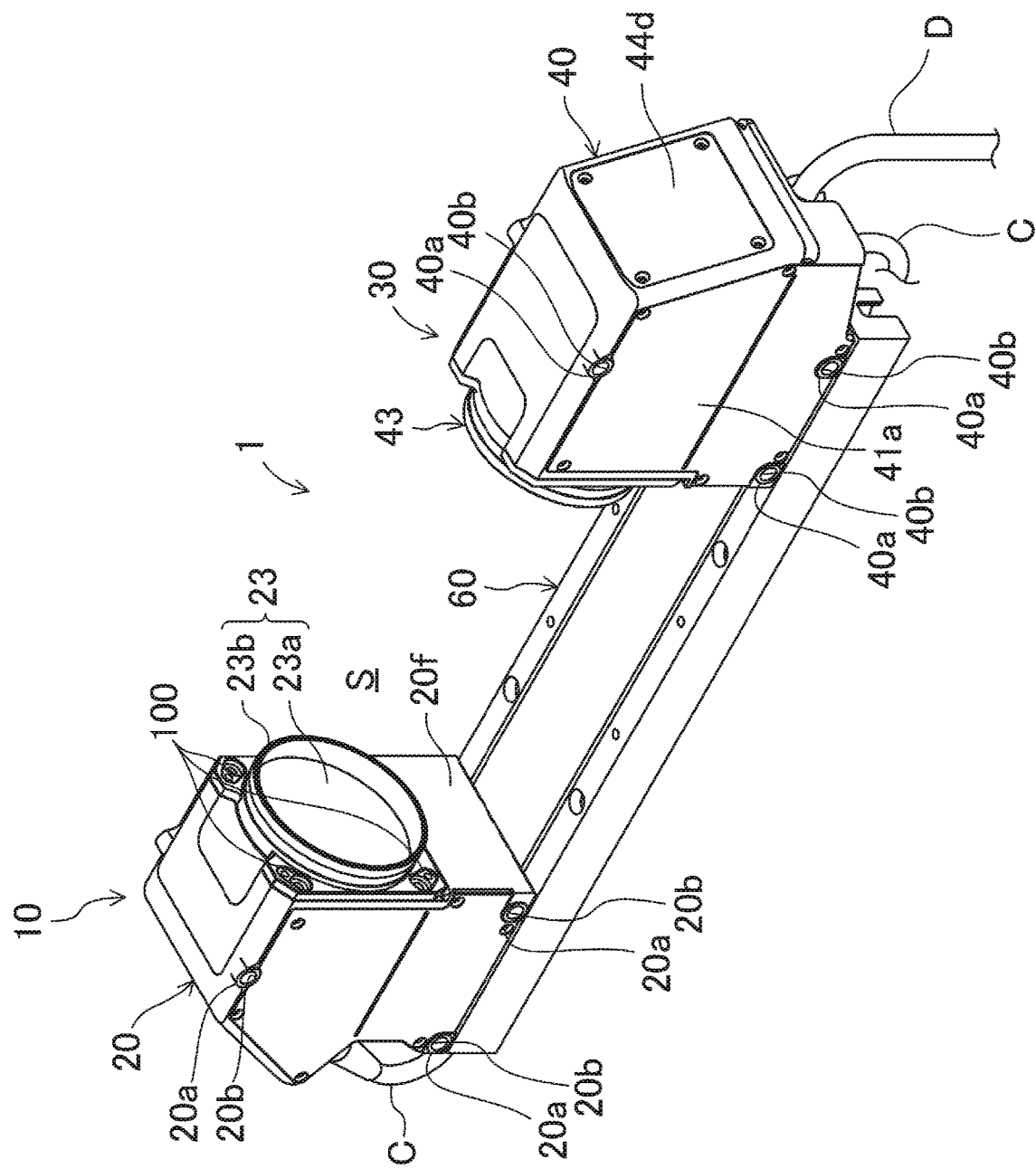
FIG. 2 is a perspective view showing an embodiment in which a light projection unit and a light receiving unit are used by fixing it to a fixing member.
Figure 3:
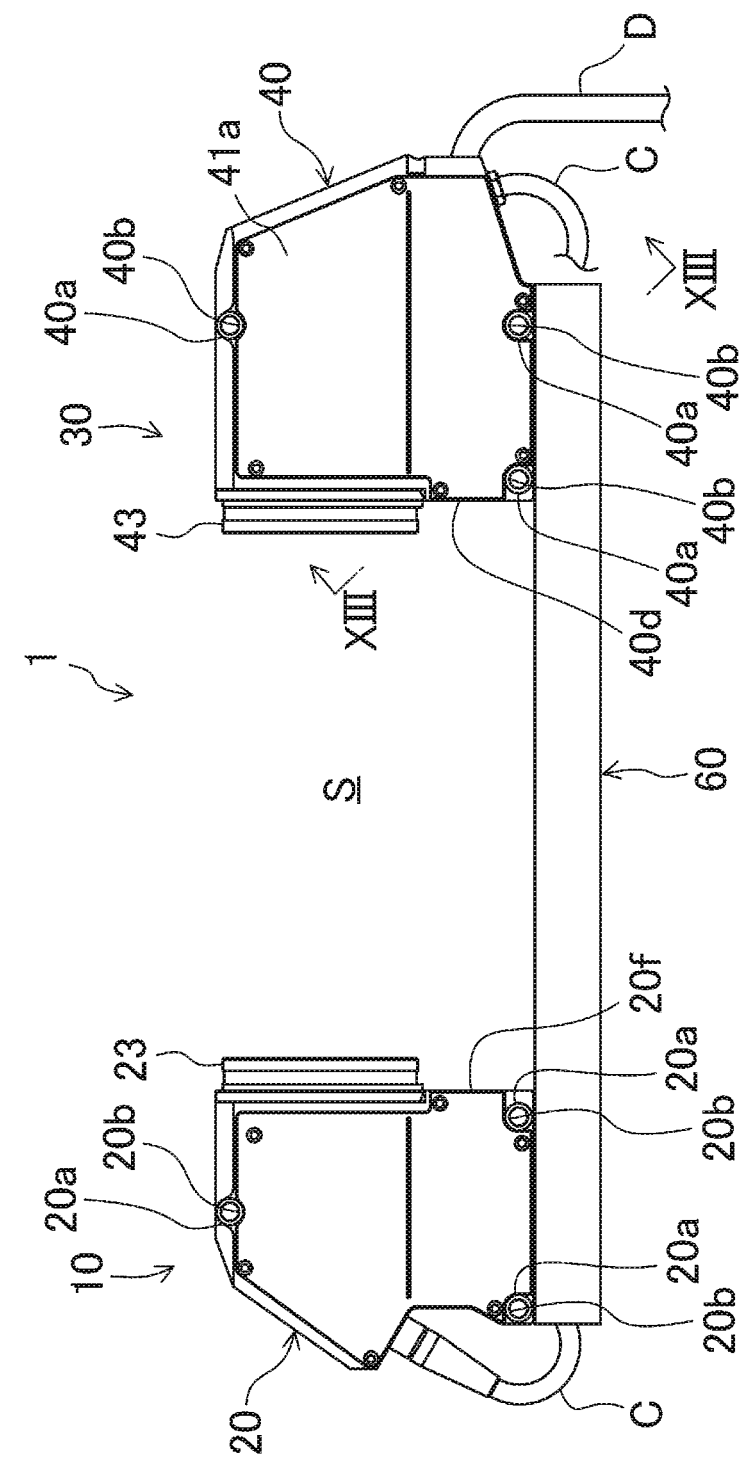
FIG. 3 is a side view showing the embodiment in which the light projection unit and the light receiving unit are used by fixing it to a fixing member.
Figure 4:
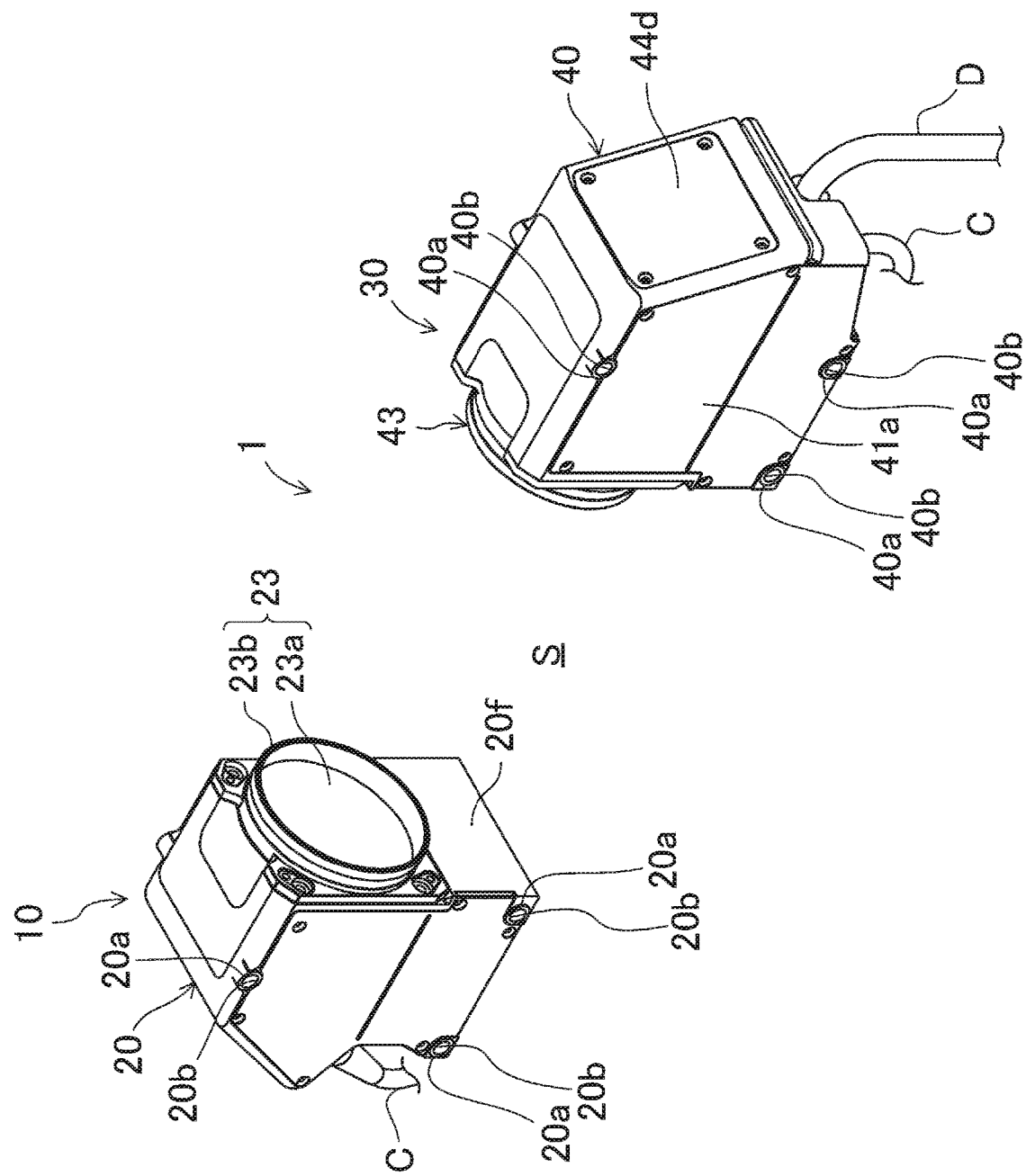
FIG. 4 is a perspective view showing an embodiment in which the light projection unit and the light receiving unit are placed without using the fixing member.

FIGS. 2 and 3 are the embodiment in which the light projection unit 10 and the light receiving unit 30 are used by commonly fixing it to the fixing member 60. The fixing member 60 is a member configuring a part of the optical measurement apparatus 1, and is configured by a metal plate elongated in a predetermined direction, and has high rigidity. It is used by mounting the light projection unit 10 at one longitudinal side of the fixing member 60, and mounting the light receiving unit 30 at the other longitudinal side of the fixing member 60. A shape of the fixing member 60 is not limited to the shape shown in the figures, but it may be, for example, a hollow member.

On the other hand, FIGS. 3 and 5 are the embodiment in which the light projection unit 10 and the light receiving unit 30 are used without fixing it to the fixing member 60. In this embodiment, the light projection unit 10 and the light receiving unit 30 are used by fixing it to various members (not shown) which are located in a place for performing the measurement.

In both of the embodiments, the measurement region S is formed between the light projection unit 10 and the light receiving unit 30. Further, the distance (working distance) between the light projection unit 10 and the light receiving unit 30 is within a distance which is set in advance.

Further, in the explanation of the embodiments, as shown in FIGS. 3 and 5, the light projection unit 10 and the light receiving unit 30 are separated in the horizontal direction, and the optical axis of both of the units 10, 30 extends in the horizontal direction. Further, a case in which both are matched will be described. Both units 10, 30 may be arranged in a manner in which the optical axis obliquely extends, or both units 10, 30 may be arranged in a manner in which the optical axis extends in the vertical direction. That is, when both units 10, 30 face to each other, it may be arranged to be the oblique direction or the vertical direction.

(Structure of Light Projection Unit 10)

As shown in FIG. 6A, the light source 11 of the light projection unit 10 is configured by a light emitting diode, etc., for example, InGaN green LED, etc., and it is mounted on a substrate 11a. The imaging control part 39 (shown in FIG. 1) configured by a microcomputer, etc. is connected to the substrate 11a, and by this imaging control part 39, the light source 11 is controlled. For example, when the imaging period is few milliseconds to few tens of milliseconds, and the exposure time in each imaging is less than 1 millisecond, depending on the imaging period or the exposure time, the light source 11 is subjected to pulse lighting control by the imaging control part 39. For example, when the exposure time in each imaging is 100 microseconds, the optical measurement apparatus 1 can measure without stopping the high-speed conveying workpiece, and since the light source 11 is subjected to pulse lighting control depending on the imaging period or the exposure time, the heating of the light source 11 can be suppressed.

The substrate 11a is fixed to the light source holder 12. By fixing the substrate 11a to the light source holder 12, the light source 11 can be held in the light source holder 12. The substrate 11a is fixed to the lower part of the light source holder 12, and on the substrate 11a, the light source 11 is arranged, and the light source 11 is provided in a posture projecting light upwardly. The substrate 11a is mounted to be capable of performing a position adjustment with respect to the light source holder 12.

In the light source holder 12, a collimating lens 12a in which the aberrations are corrected to obtain parallel light, a light diffusion unit 12b, and two light projection lenses 12c. The light projection lens 12c may be one. The collimating lens 12a is positioned at the upper part of the light source 11, and the light of the light source 11 directly enters the collimating lens 12a. The light entering the collimating lens 12a is converted to the parallel light and is emitted upward. At the upper part of the light emitting surface of the collimating lens 12a, the light diffusion unit 12b is positioned. The light diffusion unit 12b is a member for diffusing the incident light, and the incident light to the light diffusion unit 12b is diffused and emitted upward by passing through the light diffusion unit 12b. The parallel light incident from the collimating lens 12a forms a circular shaped light image in the light diffusion unit 12b. The parallel light passing through the light diffusion unit 12b is emitted from the light diffusion unit 12b as diffused light of angular characteristics in which a parallel component is defined as a peak in each point of the light image. The two light projection lenses 12c are positioned on the upper part of the light emitting surface of the light diffusion unit 12b. The light emitted from the light diffusion unit 12b passes through the two light projection lenses 12c and is emitted upward. The two light projection lenses 12c adjust a spread angle of the light emitted from the light diffusion unit 12b. By adjusting the spread angle of the light emitted from the light diffusion unit 12b to a narrow angle, the light density of the light passing through the light projection side telecentric lens 15 can be enhanced. Further, the light passing through the light projection lens 12c passes through a slit 12d, but at each position of vicinity of the slit 12d, the total light quantity or the angular distribution becomes uniform. With this, the state of the boundary of the image does not change depending on the position, and the measurement accuracy can be enhanced.

The light source 11, the collimating lens 12a, the light diffusion unit 12b, and the two light projection lenses 12c are fixed to the light source holder 12, so that it is not possible to perform the relative displacement. In this state, the collimating lens 12a, the light diffusion unit 12b, and the two light projection lenses 12c are arranged in a manner in which the optical axis of the collimating lens 12a, the light diffusion unit 12b, and the two light projection lenses 12c passes through the center of the light source 11 and is positioned on a line perpendicular to the light emission surface of the light source 11.

The light source holder 12 is mounted to the light projection housing 20 in the state in which it is stored inside the light projection housing 20. When the light source holder 12 is mounted to the light projection housing 20, a fastening structure by a screw 16 can be used. In the light source holder 12, an insertion hole (not shown) in which the screw 16 is inserted is formed, and the insertion hole is formed as a long hole, so that it is possible to perform the position adjustment of the light source holder 12. At the bottom part of the light projection housing 20, an opening for access (one example of second access opening) 20d is formed, and when adjusting the position and posture of the light source 11 or the light source holder 12, the access becomes easy. The cover 20e closes the opening for access 20d.

In the light projection housing 20, the front surface is a surface facing the light receiving housing 40, and the front surface extends in the vertical direction. The back surface of the light projection housing 20 is a surface positioned opposite to the surface facing the light receiving housing 40, and as the back surface approaches to the upper end, it is inclined as to be positioned in the front. This inclination angle corresponds to the installation angle of the light projection side reflector 14 which will be described later. A signal cable C (shown in FIG. 2, etc.) connected to the light receiving unit 30 comes outside from the lower side of the back surface. Further, the both side surfaces of the light projection housing 20 are extended in parallel in the vertical direction. The lower surface of the light projection housing 20 becomes a mounting surface to the fixing member 60.

In the inside of the light projection housing 20, the light projection side reflector 14 reflecting the light emitted from the light projection lens 12c is stored. The light projection side reflector 14 is configured by, for example, a flat mirror, etc. At the upper-side section in the inner part of the light projection housing 20, a plurality of reflector mounting parts (one example of the fourth seat) 21 for mounting the light projection side reflector 14 is provided with intervals from each other. The reflector mounting part 21 projects from the inner surface of the light projection housing 20, and at the tip end part in the projection direction, an abutting surface abutting the back surface of the reflector mounting part 21 is formed (see FIG. 11C). By projecting the reflector mounting part 21 from one side surface to the other side surface of the light projection housing 20, the inner surface of the light projection housing 20 may be reinforced. In the state in which the back surface of the light projection side reflector 14 abuts to each abutting surface 21a, the light projection side reflector 14 can be highly accurately positioned with respect to the light projection housing 20. That is, by directly abutting the light projection side reflector 14 to the abutting surface 21a of the reflector mounting part 21 which is integrally formed with the light projection housing 20, since a separate member is not existed between the light projection housing 20 and the reflector mounting part 21, the light projection side reflector 14 can be positioned in high accuracy which is almost the same as the molding accuracy of the light projection housing 20. The light projection side reflector 14 may be adhered by an adhesive agent or may be fastened by a fastening member such as a screw, etc. to the reflector mounting part 21.

The light projection side reflector 14 is arranged in an incident manner of the light emitted from the light projection lens 12c of the light source holder 12 toward the central part of the light projection side reflector 14. The angle of the light projection side reflector 14 is set in a manner of emitting the light, which is made incident from the light projection lens 12c, in the horizontal direction. The light projection side reflector 14 is the one miniaturizing the size of the light projection housing 20 by folding the optical path, but as long as the size of the light projection housing 20 is an appropriate, it is not always required.

The light projection side telecentric lens 15 is mounted in the side facing the light receiving side housing 40 in the light projection housing 20. At the wall part in the side opposite to the light receiving side housing 40 in the light projection housing 20, a light projection side lens mounting hole 22 in which the light projection side telecentric lens 15 is fitted is formed in a manner of passing through the wall part. On the inner circumferential surface of the back side of the light projection side lens mounting hole 22, a light projection side lens mounting seat (one example of the third seat) 22a which is projected radially inward and configured with projections extending in the circumferential direction is integrally formed. By abutting the peripheral edge part of the end surface of the back side (light incident side) of the light projection side telecentric lens 15 to the light projection side lens mounting seat 22a, the light projection side telecentric lens 15 is positioned with respect to the light projection housing 20. Further, by directly abutting the light projection side telecentric lens 15 to the light projection side lens mounting seat 22a, since a separate member is not existed between the light projection housing 20 and the light projection side telecentric lens 15, the light projection side telecentric lens 15 can be positioned in high accuracy which is almost the same as the molding accuracy of the light projection housing 20.

The light projection side telecentric lens 15 is arranged in a horizontal manner of the optical axis. When the light emitted from the light projection side reflector 14 is made incident to the light projection side telecentric lens 15, the light projection side telecentric lens 15 converts it to the parallel light toward the measurement region S and it is emitted. The size of the light image formed by the light projection side telecentric lens 15 at the measurement region S is constant along the optical axis of the light projection side telecentric lens 15. The light projection side telecentric lens 15 images as a light image in which the light image formed inside the light projection housing 20 is focused inside the measurement region S. It is preferable to form a light image which is focused in any position of the measurement region S. The focused light image is formed in a predetermined range along the optical axis of the light projection side telecentric lens 15, but this corresponds to the optical path length from the light image formed inside the light projection housing 20 to the light projection side telecentric lens 15, so that as the optical path length is longer, the focusing range of the light image becomes wider. For example, in the case of the optical measurement apparatus 1 in which the measurement region for high accuracy measurement is large, since the optical length from the light image formed inside the light projection housing 20 to the light projection side telecentric lens 15 is long, the size of the light projection housing 20 may be miniaturized by folding the optical path by the light projection side reflector 14.

When the parallel light is made incident from the collimating lens 12a and the circular shaped light image is formed in the light diffusion unit 12b, the parallel light passing through the light diffusion unit 12b emits from the light diffusion unit 12b as the diffused light of angular characteristics in which the parallel component is defined as a peak in each point of the light image. The light image having such angular characteristics is irradiated to the measurement region S through the light projection side telecentric lens 15, so that the light can realize approximately uniform illumination light regardless of the position or the angle. Further, the spread angle of the light emitted from the light diffusion unit 12b is adjusted to the narrow angle by the two light projection lenses 12c, so that the light density of the light passing through the light projection side telecentric lens 15 may be enhanced.

In the light projection housing 20, a light projection window 23 for projecting the parallel light, which is emitted from the light projection side telecentric lens 15, to the measurement region S is provided. The light projection window 23 is provided with a substantially circular shaped light projection side cover glass 23a which is formed to cover the light emitting surface of the light projection side telecentric lens 15, and a light projection side frame 23b in which the light projection side cover glass 23a is mounted. The light projection side frame 23b is fixed to the light projection housing 20 by fitting to the light emitting surface side of the light projection side telecentric lens 15 in the light projection side lens mounting hole 22. A light projection side elastic material (one example of the lens energizing member) 23c is arranged between the light emitting surface of the light projection side telecentric lens 15 and the light projection side frame 23b. The light projection side elastic material 23c is configured by a metal material, etc. having, for example, rubber or elasticity. By the light projection side elastic material 23c, the light projection side telecentric lens 15 is always energized in a pressing manner to the light projection side lens mounting seat 22a. The light projection side frame 23b is fixed to the light projection housing 20 by screw cramp to the light emitting surface side of the light projection side telecentric lens 15 in the light projection side lens mounting hole 22, and the light projection side telecentric lens 15 may be pressed and fixed to the light projection side lens mounting seat 22a by the light projection side elastic material 23c.

As shown in FIG. 3, at the side surface (outer surface) of the light projection housing 20, a plurality of side reference surfaces 20a (three places in FIG. 3) which becomes a reference when the light projection housing 20 is placed is provided. The side reference surfaces 20a are configured by a circular edge of the through holes 20b, and are the high accurate surfaces positioned on the same plane each other. By abutting the side reference surfaces 20a to the member in which the light projection housing 20 is placed, the light projection housing 20 can be highly accurately positioned. In this embodiment, the through hole 20b is formed at the central part of the side reference surface 20a. Further, on the other side surface (outer surface) of the light projection housing 20, the side reference surfaces may be provided in the same manner.

Further, on the bottom surface (outer surface) of the light projection housing 20, a plurality of bottom part reference surfaces 20c which becomes a reference when the light projection housing 20 is placed is provided (see FIG. 11B). The bottom part reference surfaces 20c are formed of a flat surface (convex surface) which is slightly raised in comparison with other parts, and are the high accurate surfaces positioned on the same plane each other. In this embodiment, the screw holes 101 for fixing the fixing member 20 are formed on the bottom part reference surfaces 20c. By abutting the bottom part reference surfaces 20c to the member in which the light projection housing 20 is placed, the light projection housing 20 can be highly accurately positioned. When the light projection housing 20 is placed, any of the side reference surfaces 20a and the bottom part reference surfaces 20c may be a reference. By projecting the side reference surfaces 20a and the bottom part reference surfaces 20c more than other surfaces, a planer surface to be mounted can be abutted. In a case of being placed by using the side reference surfaces 20a as a reference, by abutting the side reference surfaces 20a to the surface to be mounted, the light projection housing 20 is fixed to the surface to be mounted by penetrating a bolt for mounting to the through hole 20b of each side reference surface 20a. In a case of being placed by using the bottom part reference surfaces 20c as a reference, by abutting the bottom part reference surface 20c to the surface to be mounted, the light projection housing 20 is fixed to the surface to be mounted by screwing a screw for mounting into the screw hole 101 of each bottom part reference surface 20c. For example, each bottom part reference surface 20c is fixed to the fixing member 60 by screwing the screw for mounting into the screw hole 101 in the state of abutting the upper surface of the fixing member 60.

Further, as shown in FIG. 2, a working distance reference surface 20f is provided on the surface which is the front surface of the light projection housing 20 and is opposed to the light receiving unit 30.

The light projection housing 20 has a box-shape and opens one side surface, and it forms the reference surfaces to abut the surface to be mounted on the box-shaped side surface and/or the bottom surface. On the box-shaped front surface and/or the rear surface, a seat positioning an optical element of a reflector and a lens, etc. which determines an optical path of the measurement light is formed. The seat is formed by extending from one side surface to the other side surface, and the box-shaped front surface and/or the rear surface has more strong rigidity. For example, on the box-shaped front surface, the light projection side telecentric lens 15 is directly positioned and the seat for fixedly mounting is formed, and on the box-shaped rear surface (inner part), the light projection side reflector 14 is directly positioned and the seat for fixedly mounting is formed, and on the box-shaped closed side surface, the light source holder 12 is position-adjustably mounted. With this, more high accurate measurement light can be illuminated to the reference surfaces. Note that on the box-shaped bottom surface, the opening for access 20d may be formed for accessing the light source 11 or the light source holder 12.

(Structure of Light Receiving Unit 30)

The two-dimensional imaging element 31 of the light receiving unit 30 is configured by, for example, a CMOS image sensor, etc., and the pixels are two-dimensionally arranged in the X-direction and the Y-direction. The two-dimensional imaging element 31 is implemented in the substrate 31a. In the substrate 31a, the imaging control part 39 (shown in FIG. 1) is provided. The two-dimensional imaging element 31 is controlled by the imaging control part 39. For example, when the imaging period is few milliseconds to few tens of milliseconds, the two-dimensional imaging element 31 is controlled by the imaging control part 39, so as to be 100 microseconds of the exposure time in each imaging. The exposure time is less than 1 millisecond, for example, 100 microseconds, so that the optical measurement apparatus 1 is capable of measuring without stopping the high-speed conveying workpiece. The exposure time may be realized by synchronously controlling the pulse lighting control and the shutter control of the two-dimensional imaging element 31. The substrate 31a is fixed to the imaging element holder 37. By fixing the substrate 31a to the imaging element holder 37, the two-dimensional imaging element 31 can be held in the imaging element holder 37.

Figure 7:
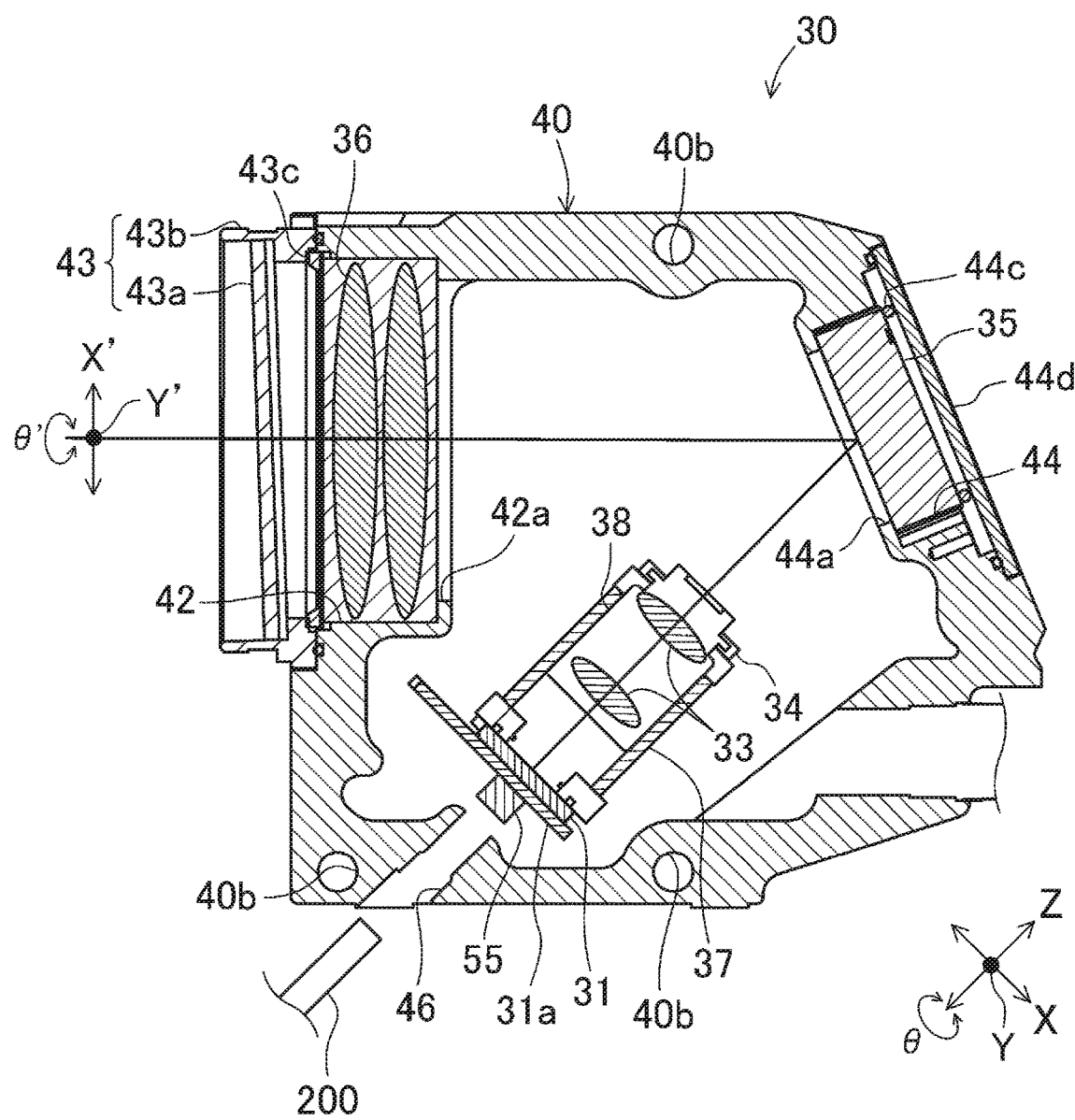
FIG. 7 is a vertical cross-sectional view of the light receiving unit.

In the imaging element holder 37, the light receiving side lens unit 38 is fixed. As shown in FIG. 7, in the light receiving side lens unit 38, it is a cylindrical-shape as a whole, and a plurality of light receiving lenses (imaging lens) 33 is provided inside the light receiving side lens unit 38. The optical axis of the light receiving lens 33 extends in the oblique direction, and the relative positional relationship between the light receiving side lens unit 38 and the two-dimensional imaging element 31 is set in a manner in which the extended line of the optical axis of the light receiving lens 33 perpendicularly intersects with the central part of the two-dimensional imaging element 31. At the upper part of the light receiving side lens unit 38, the diaphragm 34 is provided.

The diaphragm 34 passes the parallel light which is received through the light receiving side telecentric lens 36, and blocks the disturbance light other than the parallel light. With this, the effect of the disturbance light can be reduced. The light receiving lens 33 may be the image side telecentric lens. By the image side telecentric lens, although the distance between the light receiving lens 33 and the two-dimensional imaging element 31 changes, the size of the image formed on the two-dimensional imaging element 31 does not change. For example, although the distance between the light receiving lens 33 and the two-dimensional imaging element 31 changes by thermally expanding the imaging element holder 37, the size of the image formed on the two-dimensional imaging element 31 does not change, so that the effect of the temperature change can be reduced. The light projection side telecentric lens 15 is defined as the object side telecentric lens, and the light receiving lens 33 is defined as the image side telecentric lens, so that it can be both side telecentric optical system.

Figure 11A:
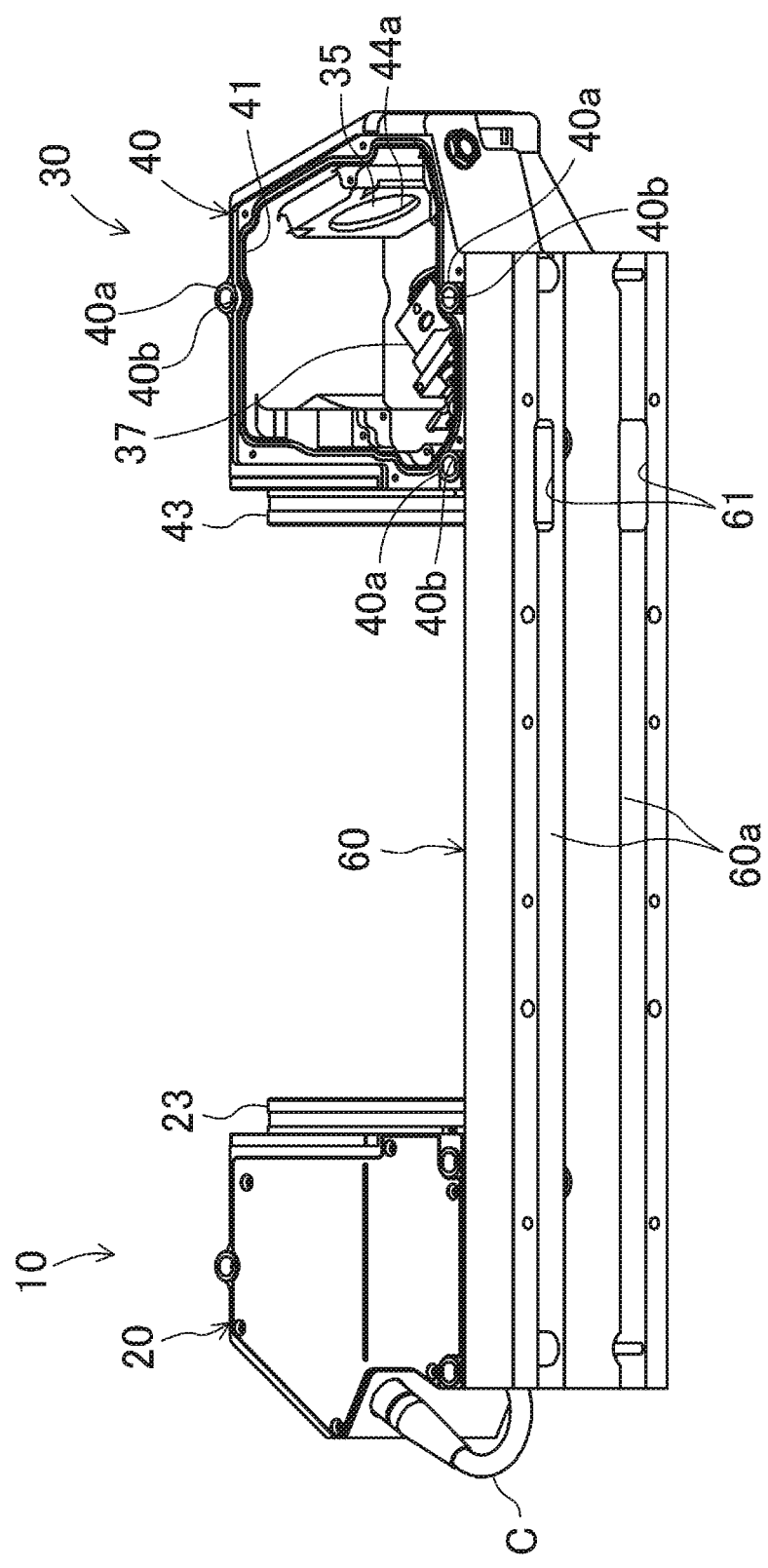
FIG. 11A is a perspective view of the light projection unit and the light receiving unit fixed on the fixing member which are obliquely viewed from the lower side, and showing the state in which a cover of the light receiving unit opens.
Figure 11C:
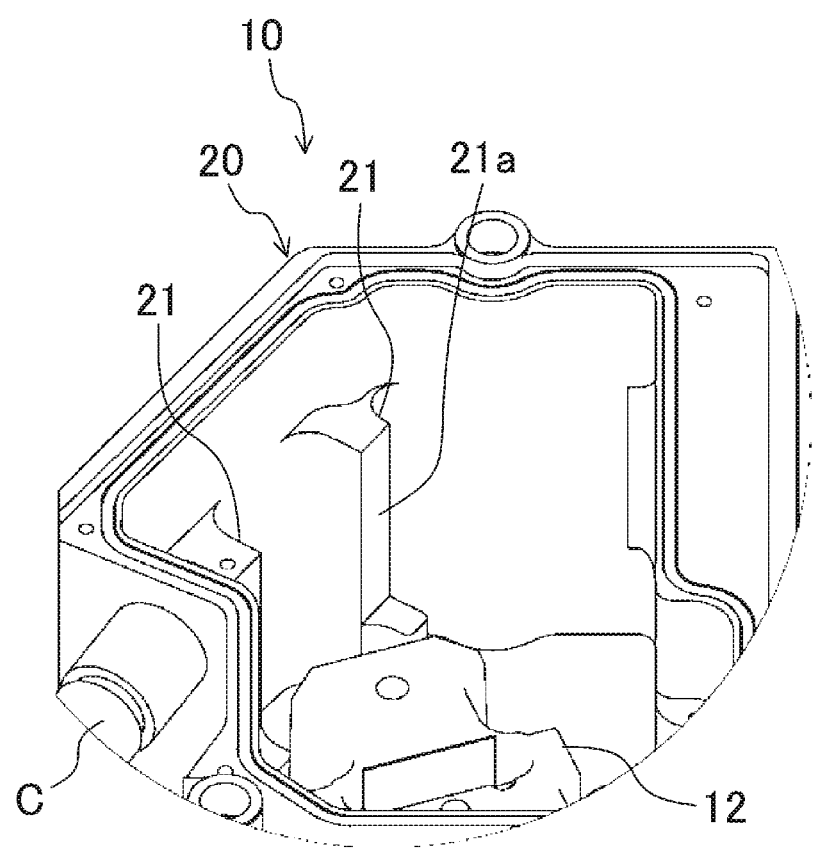
FIG. 11C is a perspective view showing the reflector mounting part of the light projection unit and its vicinity.

In the imaging element holder 37, the light receiving housing 40 is mounted in the state in which the two-dimensional imaging element 31 is fixed, that is, the state in which the positional relationship of the two-dimensional imaging element 31, the light receiving lens 33, and the diaphragm 34 is constantly held. As shown in FIG. 11A, in one side of the side wall of the light receiving housing 40, an introducing opening 41 for installing the imaging element holder 37 in the state in which the two-dimensional imaging element 31 is held is formed. The introducing opening 41 opens over approximately the entire upper side of the side wall in one side of the light receiving housing 40, and the introducing opening 41 opens large in this way, so that it is possible to easily insert the imaging element holder 37, which is integrated with the two-dimensional imaging element 31, inside the light receiving housing 40.

The light receiving housing 40 is the front surface which is the surface opposite to the light projection housing 20, and the front surface extends in the vertical direction. The back surface of the light receiving housing 40 is the surface positioned opposite to the surface facing the light projection housing 20, and as the back surface approaches to the upper end, it is inclined as to be positioned in the front, and the inclination angle corresponds to the installation angle of the light receiving side reflector 35 which will be described later. A signal cable C connected with the light projection unit 10 and a connecting cable D (shown in FIG. 2, etc.) connected with the control device 70 come outside from the lower side of the back surface. Further, the both side surfaces of the light receiving housing 40 extend in the vertical direction and parallel to each other. The lower surface of the light receiving housing 40 is the mounting surface to the fixing member 60.

As shown in FIG. 2, etc., in the light receiving housing 40, a cover 41a for closing the introducing opening 41 is provided. The cover 41a is detachably mounted to the light receiving housing 40. A sealing material between the peripheral edge part of cover lid 41a and the peripheral edge part of the introducing opening 41 is arranged.

Figure 6B:
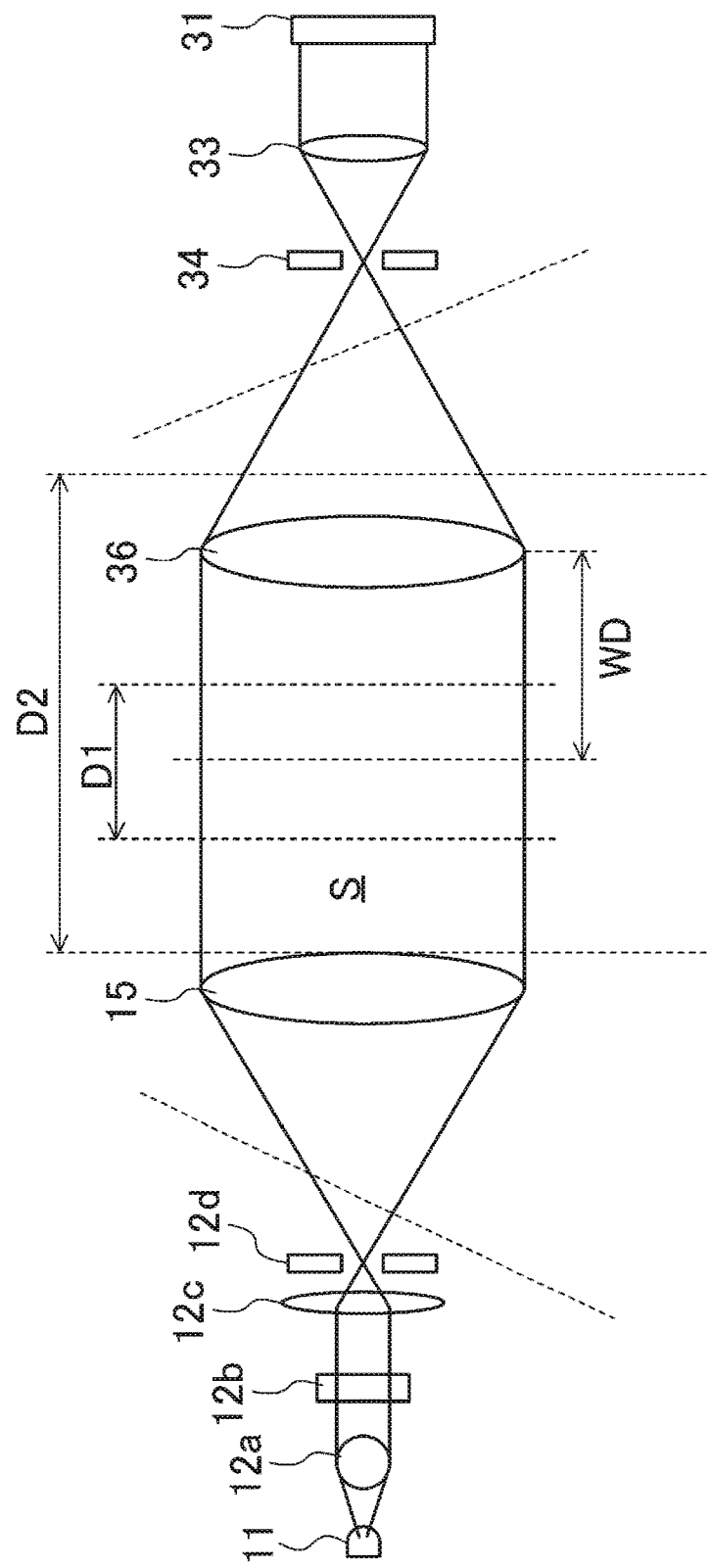
FIG. 6B is a diagram explaining a position or a size of a light image.

As shown in FIG. 6A, the light receiving side telecentric lens 36 is mounted in the opposite side of the light projection side housing 20 in the light receiving housing 40, and its optical axis is arranged in a manner of being positioned on the same optical axis with the light projection side telecentric lens 15. Here, the further detail about the position or the size of the light image will be described with reference to FIG. 6B.

In FIG. 6B, the light receiving side telecentric lens 36 guides the parallel light, which is directed to the measurement region S by the light projection side telecentric lens 15, to the two-dimensional imaging element 31 through the light receiving side lens unit 38. The size of the light image formed by the light projection side telecentric lens 15 in the measurement region S becomes constant along the optical axis of the light projection side telecentric lens 15. Similarly, the light receiving side telecentric lens 36 makes the view field size constant along the optical axis of the light receiving side telecentric lens 36. That is, although a measuring object is placed in a different position along the optical axis of the light receiving side telecentric lens 36, the light receiving side telecentric lens 36 makes the size of the light image corresponding to the light shielding image of the measuring object constant on the two-dimensional imaging element 31. The light receiving side telecentric lens 36 forms the light shielding image within the measurement region S of the measuring object as the light image focused on the two-dimensional imaging element 31. It is preferable to form the light image focused on the two-dimensional imaging element 31 even when the measuring object is placed in any position of the measurement region S. The range along the optical axis of the light receiving side telecentric lens 36 in which the light image focused on the two-dimensional imaging element 31 is formed may be called as a depth of field (D1). The size of the depth of field corresponds to the optical path length from the light receiving side telecentric lens 36 to the light image formed inside the light receiving housing 40, so that the range focusing the light image becomes wider as the optical path length becomes longer. For example, in the case of the optical measurement apparatus 1 having large measurement region for measurement with high accuracy, since the optical path length from the light receiving side telecentric lens 36 to the light image formed inside the light receiving housing 40 is long, the size of the light receiving housing 40 may be miniaturized by folding the optical path by the light receiving side reflector 35. For example, the depth of field may be set approximately 20 mm to the optical measurement apparatus 1 in which the view field size is 40 mm in diameter, and the depth of field may be set approximately 30 mm to the optical measurement apparatus 1 in which the view field size is 64 mm in diameter. In this case, the size of the light receiving housing 40 may be miniaturized by folding the optical path by the light receiving side reflector 35 (shown in a dotted line in FIG. 6B. Similar to the light projection side). Further, for example, the depth of field to the optical measurement apparatus 1 in which the view field size is approximately 6 mm in diameter may be set approximately 4 mm. In this case, the light receiving housing 40 may be an elongated shape along the optical axis of the light receiving side telecentric lens 36 without providing the light receiving side reflector 35.

Figure 8A:
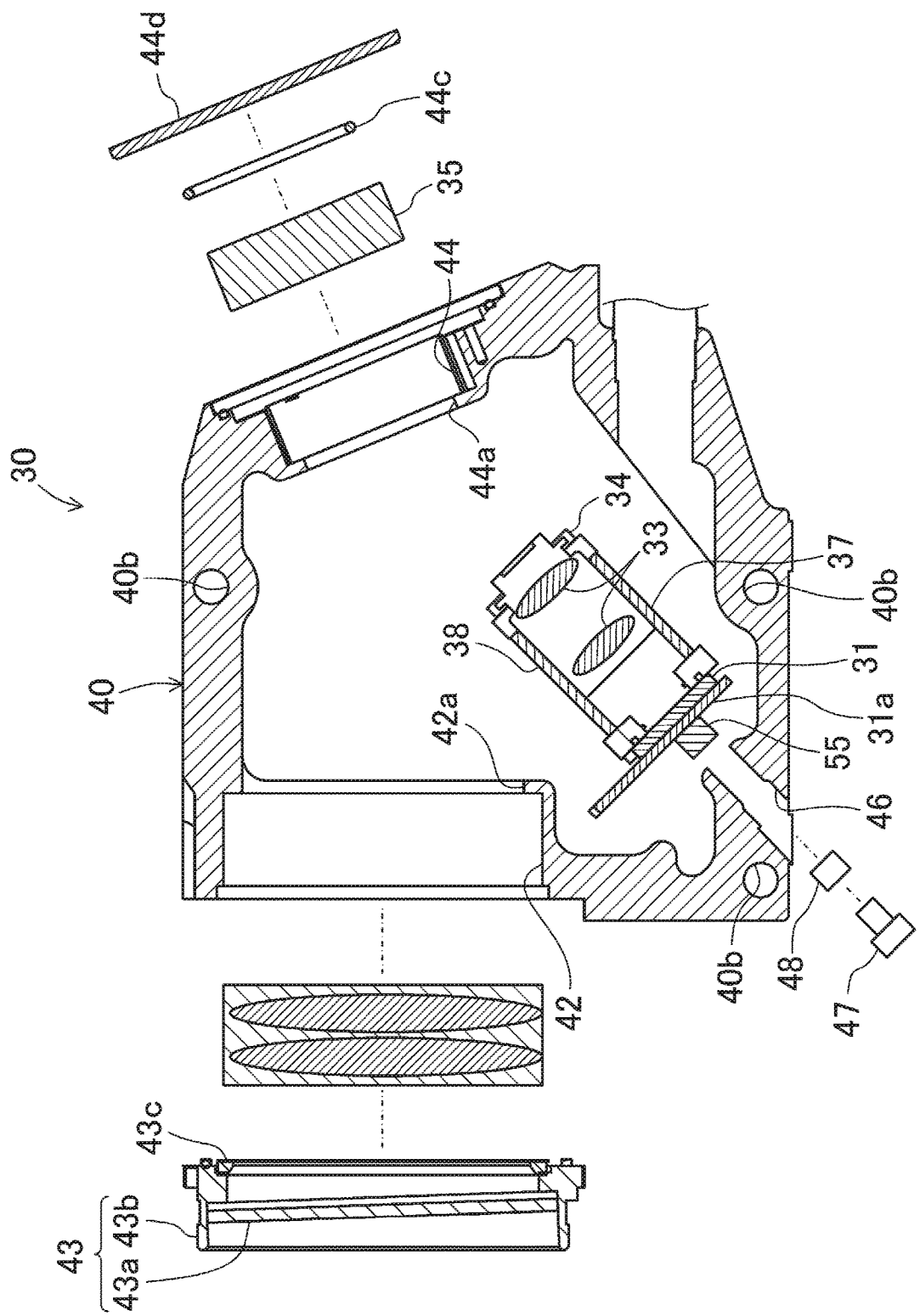
FIG. 8A is a diagram corresponding to FIG. 7 and showing a state in which a telecentric lens and a light receiving side reflector are removed.

As shown in FIGS. 7 and 8A, at the wall part in the side facing the light projection side housing 20 in the light receiving housing 40, the light receiving side lens mounting hole 42 in which the light receiving side telecentric lens 36 is fitted is formed in a manner of penetrating the wall part. On the inner circumferential surface in the back side of the light receiving side lens mounting hole 42, a light receiving side lens mounting seat (one example of the first seat) 42a which projects radially inward and is configured by a projection extending in the circumferential direction is integrally formed. By abutting the peripheral edge part of the end surface of the back side (light emitting side) of the light receiving side telecentric lens 36 to the light receiving side lens mounting seat 42a, the light receiving telecentric lens 36 is positioned with respect to the light receiving housing 40. By directly abutting the light receiving side telecentric lens 36 to the light receiving side lens mounting seat 42a, since a separate member is not existed between the light receiving housing 40 and the light receiving side telecentric lens 36, the light receiving side telecentric lens 36 can be positioned with high accuracy which is almost the same as the molding accuracy of the light receiving housing 40.

In the light receiving housing 40, a light receiving window 43 which is made incident the parallel light emitted from the light projection side telecentric lens 15 and passing through the measurement region S to the light receiving side telecentric lens 36 is provided. The light receiving window 43 is provided with a substantially circular shaped light receiving side cover glass 43a formed to cover the light incident surface of the light receiving side telecentric lens 36, and the light receiving side frame 43b in which the light receiving side cover glass 43a is mounted. The light receiving side frame 43b is fixed to the light receiving housing 40 fitted in the light incident surface side of the light receiving side telecentric lens 36 in the light receiving side lens mounting hole 42. A light receiving side elastic material (one of the lens energizing member) 43c is arranged between the light incident surface of the light receiving side telecentric lens 36 and the light receiving side frame 43b. The light receiving side elastic material 43c is configured by, for example, a metal material, etc. having rubber or elasticity, and is the member for always energizing the light receiving side telecentric lens 36 in a direction pressing the light receiving side lens mounting seat 42a. By the light receiving side elastic material 43c, the light receiving side telecentric lens 36 is mounted in the state of being always pressed to the light receiving side lens mounting seat 42a. The light receiving side frame 43b is fixed to the light receiving housing 40 by screw cramp in the light incident surface side of the light receiving side telecentric lens 36 in the light receiving side lens mounting hole 42, and the light receiving side telecentric lens 36 may be pressed and fixed to the light receiving side lens mounting seat 42a by the light receiving side elastic material 43c.

Figure 11D:
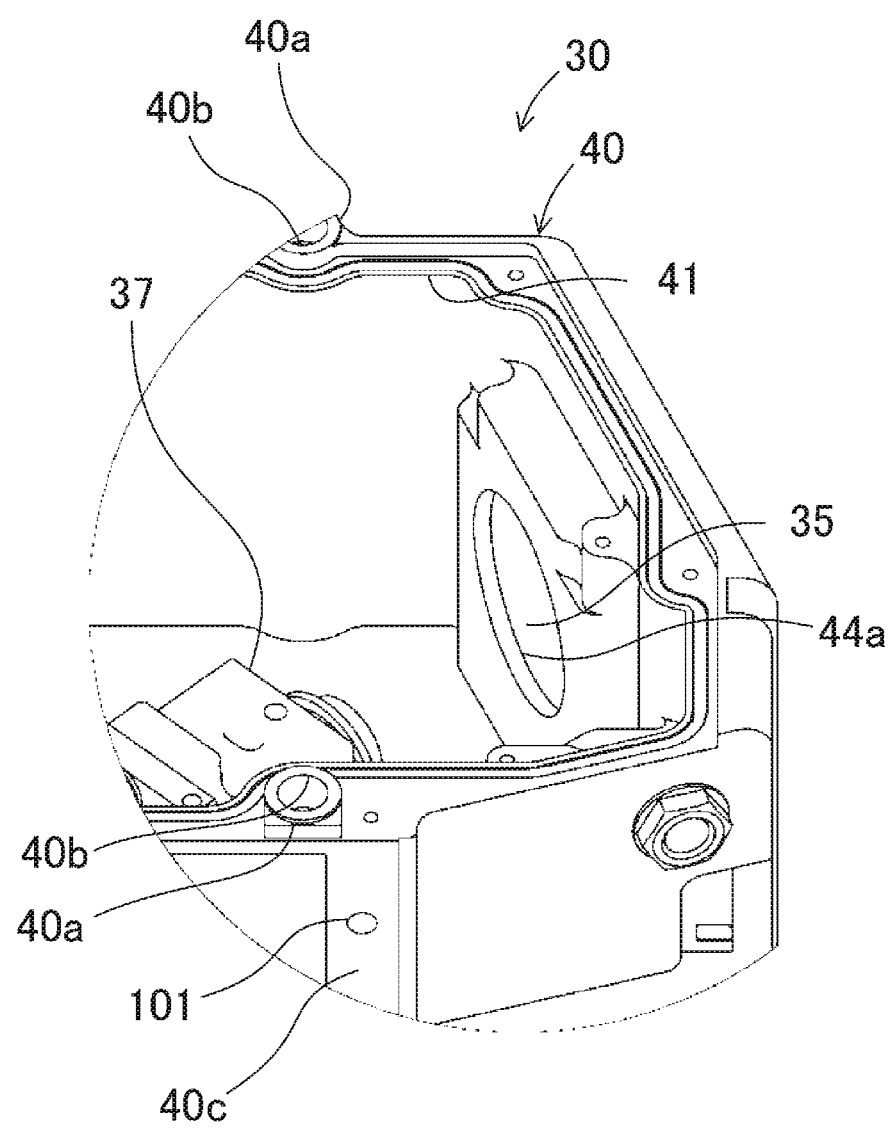
FIG. 11D is a perspective view showing the light receiving side reflector mounting seat of the light receiving unit and its vicinity.

In the surface different from the surface on which the introducing opening 41 is formed in the light receiving housing 40, that is, the surface positioned in the opposite side of the light projection unit 10, the light receiving side reflector mounting hole 44 fitting the light receiving side reflector 35 opens. On the inner circumferential surface of the back side of the light receiving side reflector mounting hole 44, a light receiving side reflector mounting seat (one example of the second seat) 44a which projects radially inward and is configured by a projection extending in the circumferential direction is integrally formed (see FIG. 11D). By abutting the peripheral edge part of the back side of the light receiving side reflector 35 to this light receiving side reflector mounting seat 44a, the light receiving side reflector 35 is positioned with respect to the light receiving housing 40. By directly abutting the light receiving side reflector 35 to the light receiving side reflector mounting seat 44a, since a separate member is not existed between the light receiving housing 40 and the light receiving side reflector 35, the light receiving side reflector 35 can be positioned with high accuracy which is almost the same as the molding accuracy of the light receiving housing 40.

The light receiving side reflector 35 is configured by, for example, a flat mirror, etc. The light receiving side reflector 35 is arranged in a manner in which the light emitted from the light emitting surface of the light receiving side telecentric lens 36 is made incident toward the central part of the light receiving side reflector 35. The angle of the light receiving side reflector 35 is set in a manner in which the light passed through the light receiving side telecentric lens 36 is returned by the reflection and emitted toward the light receiving lens 33. Since the light is returned by the light receiving side reflector 35, the two-dimensional imaging element 31 and the light receiving side telecentric lens 36, which are the heat generating source, can be separated.

In the light receiving housing 40, a cover 44d covering the reflector mounting hole 44 from the outside of the light receiving housing 40 is mounted. The cover 44d is detachably mounted to the light receiving housing 40. A reflector side elastic material (reflector energizing member) 44c is arranged between the inner surface of the cover 44d and the light receiving side reflector 35. The reflector elastic material 44c is configured by, for example, a metal material, etc. having rubber or elasticity, and is the member for always energizing the light receiving side reflector 35 in a direction pressing the light receiving side reflector mounting seat 44a. By the reflector side elastic material 44c, the light receiving side reflector 35 is mounted in the state of being always pressed to the light receiving side reflector mounting seat 44a. The cover 44d is fixed to the light receiving housing 40 by screw cramp, and the light receiving side reflector 35 is pressed and fixed to the light receiving side reflector mounting seat 44a by the reflector side elastic material 44c.

Figure 12:
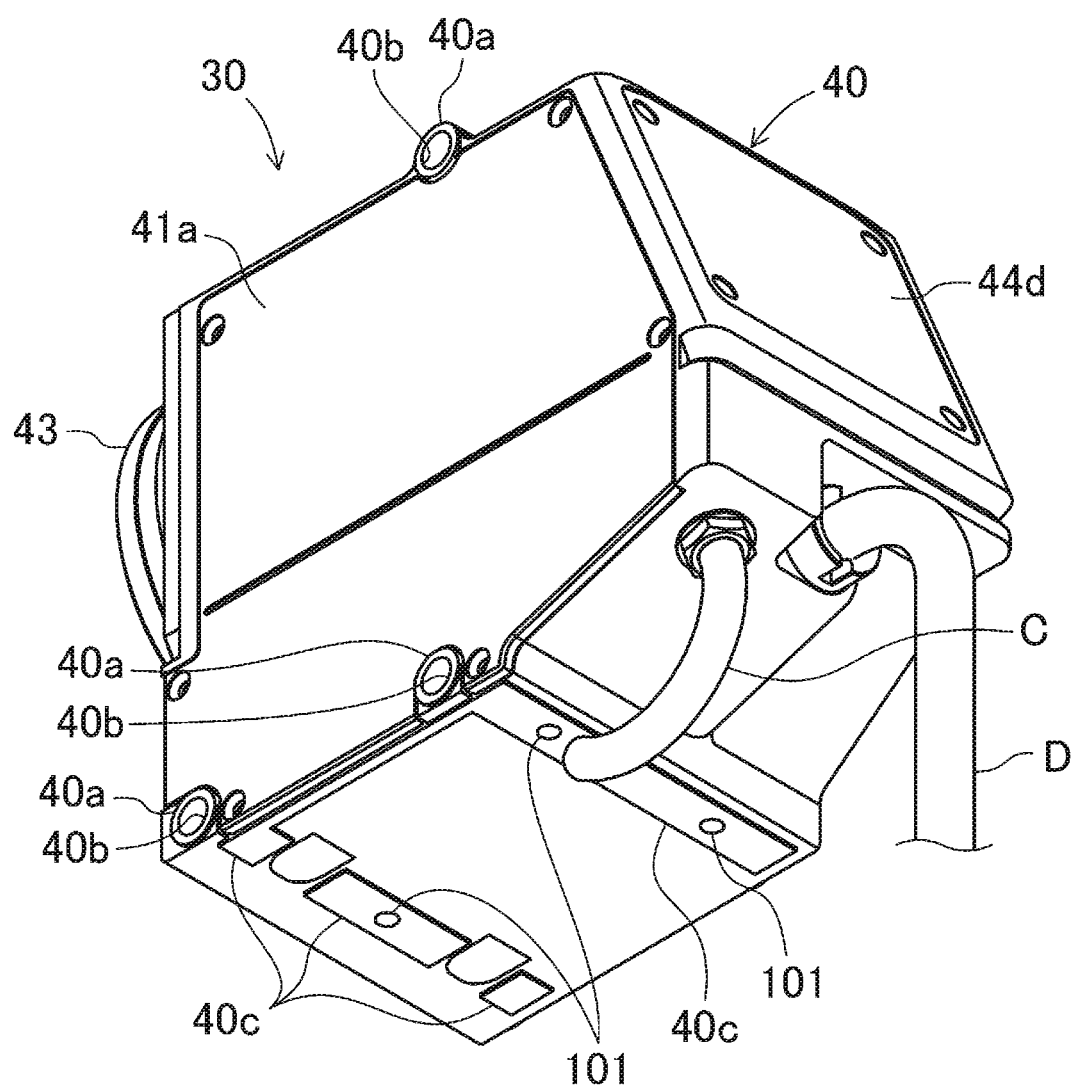
FIG. 12 is a perspective view showing the light receiving unit which is obliquely viewed from the lower side.
Figure 13:
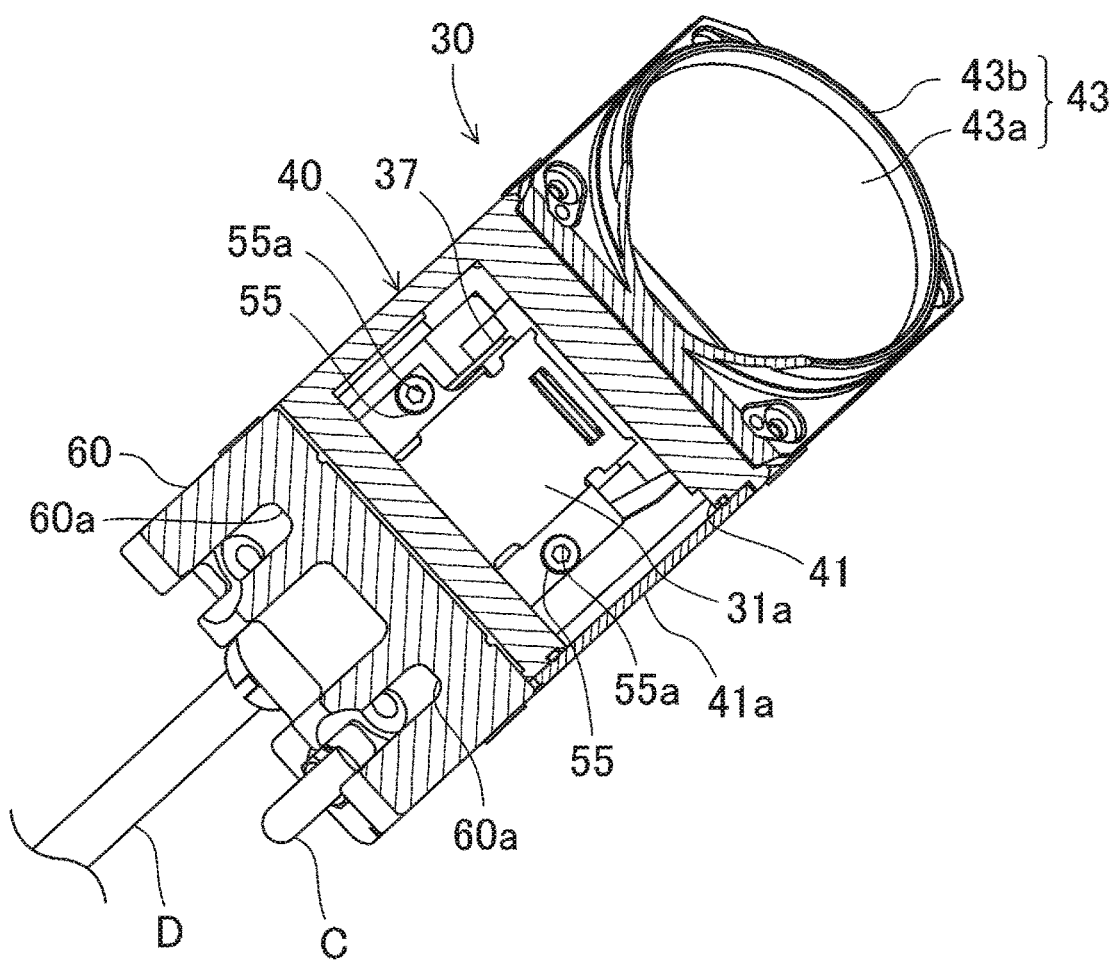
FIG. 13 is a XIII-XIII line cross-sectional view shown in FIG. 3.

As shown in FIG. 12, on the side surface (outer surface) of the light receiving housing 40, a plurality of side reference surfaces 40a (three places in FIG. 12) which becomes a reference at the time of placing the light receiving housing 40 is provided. The side reference surfaces 40a are configured by the circular edge of the through holes 40b, and are the high accurate surfaces positioned on the same plane each other. By abutting the side reference surface 40a to the member in which the light receiving housing 40 is placed, the light receiving housing 40 can be highly accurately positioned. In this embodiment, the through hole 40b is formed at the central part of the side reference surface 40a. On the other side surface (outer surface) of the light receiving housing 40, the side reference surfaces may be provided in the same manner.

Further, on the bottom surface (outer surface) of the light receiving housing 40, a plurality of bottom part reference surfaces 40c which is a reference at the time of placing the light receiving housing 40 is provided. The bottom part reference surfaces 40c are formed of a flat surface, and are the high accurate surfaces positioned on the same plane surface each other. In this embodiment, the screw holes 101 are formed on the bottom part reference surfaces 40c. By abutting the bottom part reference surfaces 40c to the member placing the light receiving housing 40, the light receiving housing 40 can be highly accurately positioned. When placing the light receiving housing 40, any of the side reference surfaces 40a and the bottom part reference surfaces 40c may be a reference. By projecting the side reference surfaces 40a and the bottom part reference surfaces 40c more than other surfaces, a planer surface to be mounted can be abutted. When placing the side reference surfaces 40a as a reference, by abutting the side reference surfaces 40a to the surface to be mounted, the light receiving housing 40 is fixed to the surface to be mounted by penetrating a bolt for mounting through the through hole 40b of each side reference surface 40a. When placing the bottom part reference surfaces 40c as a reference, by abutting the bottom part reference surfaces 40c to the surface to be mounted, the light receiving housing 40 is fixed to the surface to be mounted by screwing a screw for mounting into the screw hole 101 of each bottom part reference surface 40c. For example, each bottom part reference surface 60c is screwed by the screw for mounting into the screw hole 101 in the state of being abutted to the upper surface of the fixing member 60, and it is fixed to the fixing member 60.

Further, as shown in FIG. 3, in the surface opposite to the light projection unit 10 which is the front surface of the light receiving housing 40, a working distance reference surface 40d is provided.

The light receiving housing 40 has a box-shape and opens one side surface, and forms the reference surfaces to abut the surface to be mounted at the box-shaped side surface and/or the bottom surface. On the box-shaped front surface and/or the rear surface, a seat positioning an optical element of a reflector and a lens, etc. which determines the optical path of the measurement light is formed. The seat is formed by extending from one side surface to the other side surface, and the box-shaped front surface and/or the rear surface has more strong rigidity. For example, on the box-shaped front surface, the light receiving side telecentric lens 36 is directly positioned, and the seat for fixedly mounting is formed, and on the box-shaped rear surface (inner part), the light receiving side reflector 35 is directly positioned, and the seat for fixedly mounting is formed, and on the box-shaped closed side surface, the imaging element holder 37 is position-adjustably mounted. With this, high accurate measurement light can be illuminated to the reference surfaces. Note that on the box-shaped bottom surface, the opening for access (one example of the first access opening) 46 may be formed for position-adjusting the two-dimensional imaging element 31 or the light element holder 37.

Figure 8B:
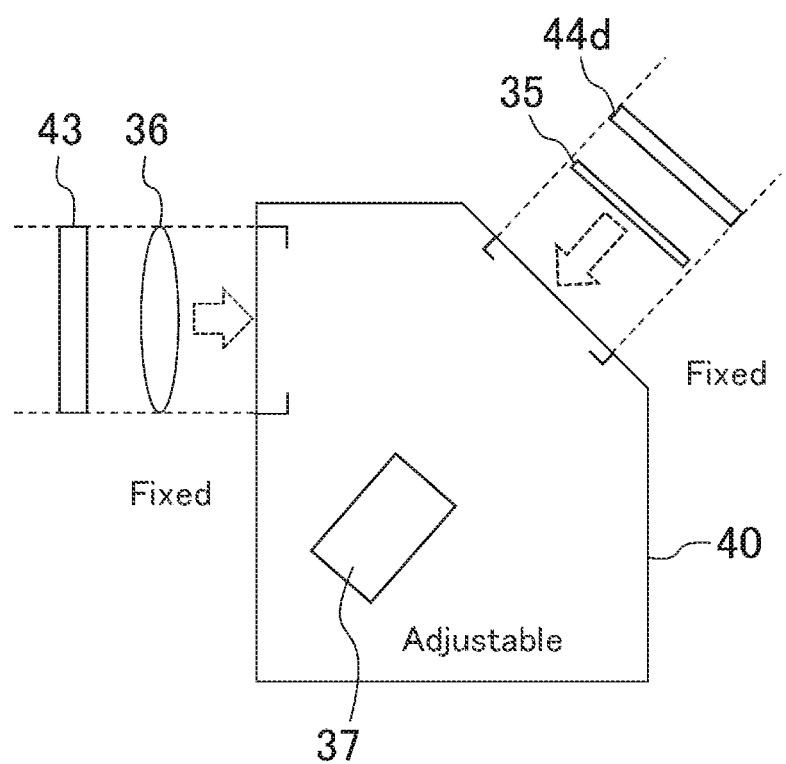
FIG. 8B is a diagram explaining a schematic of a mounting structure in each part to the light receiving housing.

In other words, as shown in FIG. 8B, in the light receiving housing 40 according to the present embodiment, the light receiving side telecentric lens 36 and the light receiving side reflector 35 are fixed to the wall surface of the light receiving housing 40 which has high rigidity, and the imaging element holder 37 is position-adjustably mounted. With this, the high accurate measurement can be realized.

(Structure of Control Device 70)

As shown in FIG. 1, the imaging control part 39 provided in the light receiving unit 30 is controlled by the image acquiring part 71 of the control device 70 through the connecting cable D, and the light is emitted to the light source 11 at a predetermined timing, and an image is captured by the two-dimensional imaging element 31. The electric power driving the light receiving unit 30 is supplied from the control device 70 via the connecting cable D. In the connecting cable D, a bending resistant cable can be used, and the light receiving unit 30 and the light projection unit 10 are placed in a movable part of robot arms, etc., and the control device 70 can be separately arranged so as to be immovably placed, etc. The light source 11 and the two-dimensional imaging element 31 can be synchronized by the signal cable C. For example, in the case in which the imaging period is few milliseconds to few tens of milliseconds, in order the exposure time to be 100 microseconds in each imaging, a timing signal determining an imaging timing and an exposure timing is supplied to the two-dimensional imaging element 31 by the imaging control part 39, and a timing signal determining an emission timing is supplied via the signal cable C to the light source 11 by the imaging control part 39. The electric power driving the light source 11 is supplied from the light receiving unit 30 via the signal cable C. After the measurement light generated by the light source 11 is diffused by the diffusion means 13, it is reflected and returned by the light projection side reflector 14 and is made incident to the light projection side telecentric lens 15. The light projection side telecentric lens 15 converts the incident measurement light to the parallel light and it is emitted toward the measurement region S. That is, the light projection side telecentric lens 15 emits the measurement light to form the light image on the diffusion means 13 by the measurement light and the light image having a size to be constant along the optical axis of the light projection side telecentric lens 15 on the measurement region S. In this time, the parallel light reaches to the measurement region S via the light receiving window 23. When the workpiece W is arranged in the measurement region S, a part of the parallel light is shielded by the workpiece W.

After passing the light receiving window 43 and being made incident to the light receiving side telecentric lens 36, the parallel light passed through the measurement region S is reflected and returned at the light receiving side reflector 35, and passes through the diaphragm 34 and the light receiving lens 33. And, the image of the workpiece W is imaged on the imaging face of the two-dimensional imaging element 31. The image acquiring part 71 of the control device 70 acquires the measurement image of the workpiece W by controlling the two-dimensional imaging element 31 and capturing the image by the two-dimensional imaging element 31. The measurement image of the acquired workpiece W is substantially circular shaped image. The DSP 72 performs an imaging processing such as a filtering processing, etc. to the acquired measurement image by the image acquiring part 71. The CPU 73 extracts an edge of the measurement image outputted from the DSP 72, and the dimension measurement is performed by using the extracted edge. The measurement image or the measurement result, etc. can be temporarily stored in the memory 74. The measurement image or the measurement result, etc. is outputted from the input output circuit 75 to the storage device 83, the programmable controller 90, and the display device 82.

(Adjusting Mechanism of Position and Posture of Two-Dimensional Image Element)

As described above, the optical measurement apparatus 1 in which the image of the workpiece W is imaged on the imaging face of the two-dimensional imaging element 31 over the workpiece W by projecting the measurement light from the light source 11 to the measurement region S is also used for the positioning or the alignment measurement, etc. of the workpiece W, other than the measurement of the geometries of the workpiece W. In this case, when the optical axis is not horizontal and vertical with respect to the reference surface, the workpiece is imaged on the imaging face in the shift position of the workpiece W at the time that the workpiece W is moved in the optical axis direction, so that the measurement accuracy may be deteriorated. Specifically, when the manufacturing error or the assembling error of the parts configuring the optical measurement apparatus 1 occurs, or when the optical axis of the two-dimensional imaging element 31 is tilted by an error of a tool for adjustment, etc., the aforementioned measurement accuracy is deteriorated notably.

Figure 9:
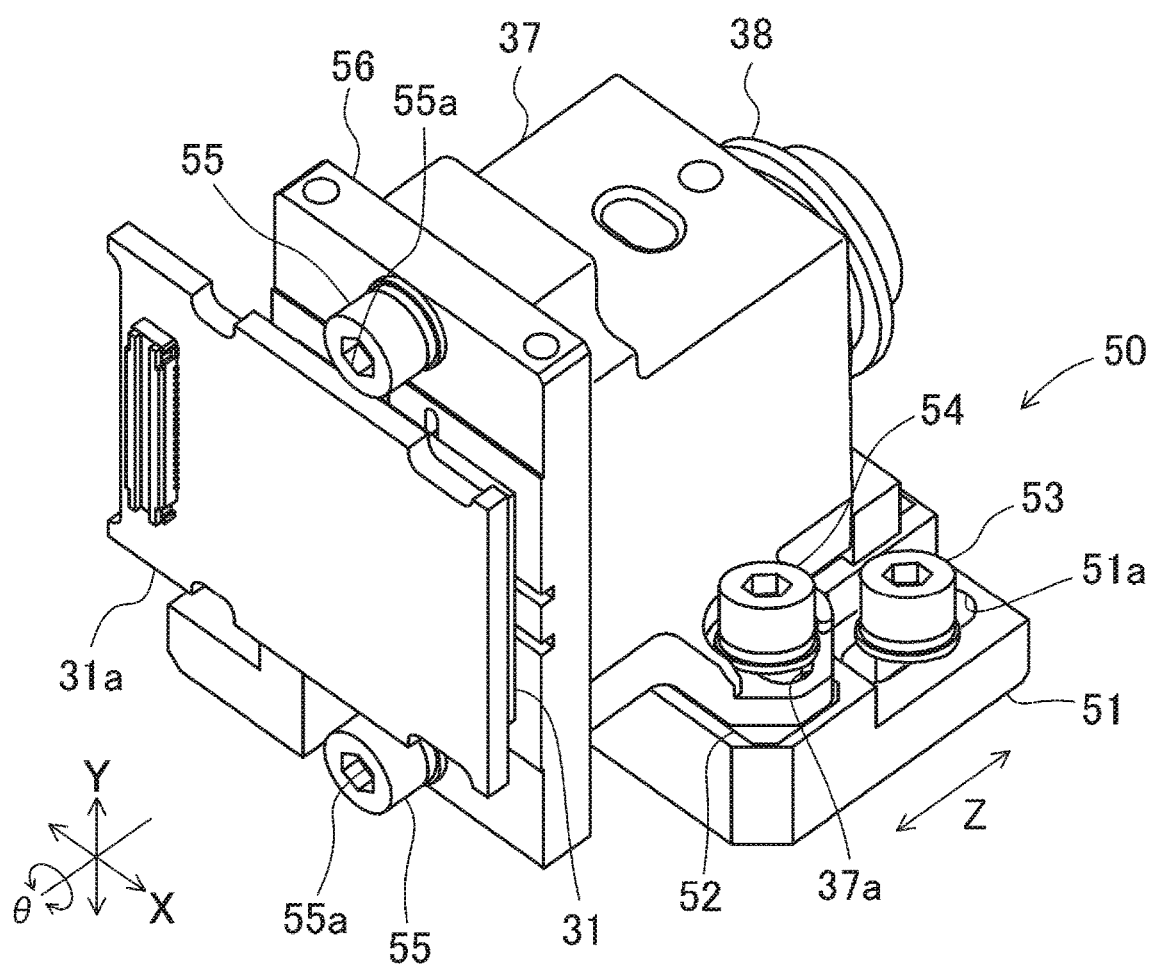
FIG. 9 is a perspective view of an image element holder in which a two-dimensional imaging element is fixed.

Accordingly, in the present embodiment, the two-dimensional imaging element 31 is held in the imaging element holder 37, and is mounted in the light receiving side housing 40 via an adjusting mechanism 50 which is capable of adjusting the position and the posture of the two-dimensional imaging element 31. As shown in FIG. 9, the adjusting mechanism 50 is configured to linearly translate the two-dimensional imaging element 31 in the X-direction and the Y-direction, and to rotate it in the θ-direction. Further, the two-dimensional imaging element 31 is capable of being translated in the Z-direction by the adjusting mechanism 50 as shown in FIG. 7. The X-direction corresponds to the X-direction of the two-dimensional imaging element 31. The Y-direction corresponds to the Y-direction of the two-dimensional imaging element 31, and is the width direction of the light receiving unit 30. The Z-direction is the direction orthogonal to the imaging face of the two-dimensional imaging element 31. The θ-direction is around the Z-axis.

Figure 10:
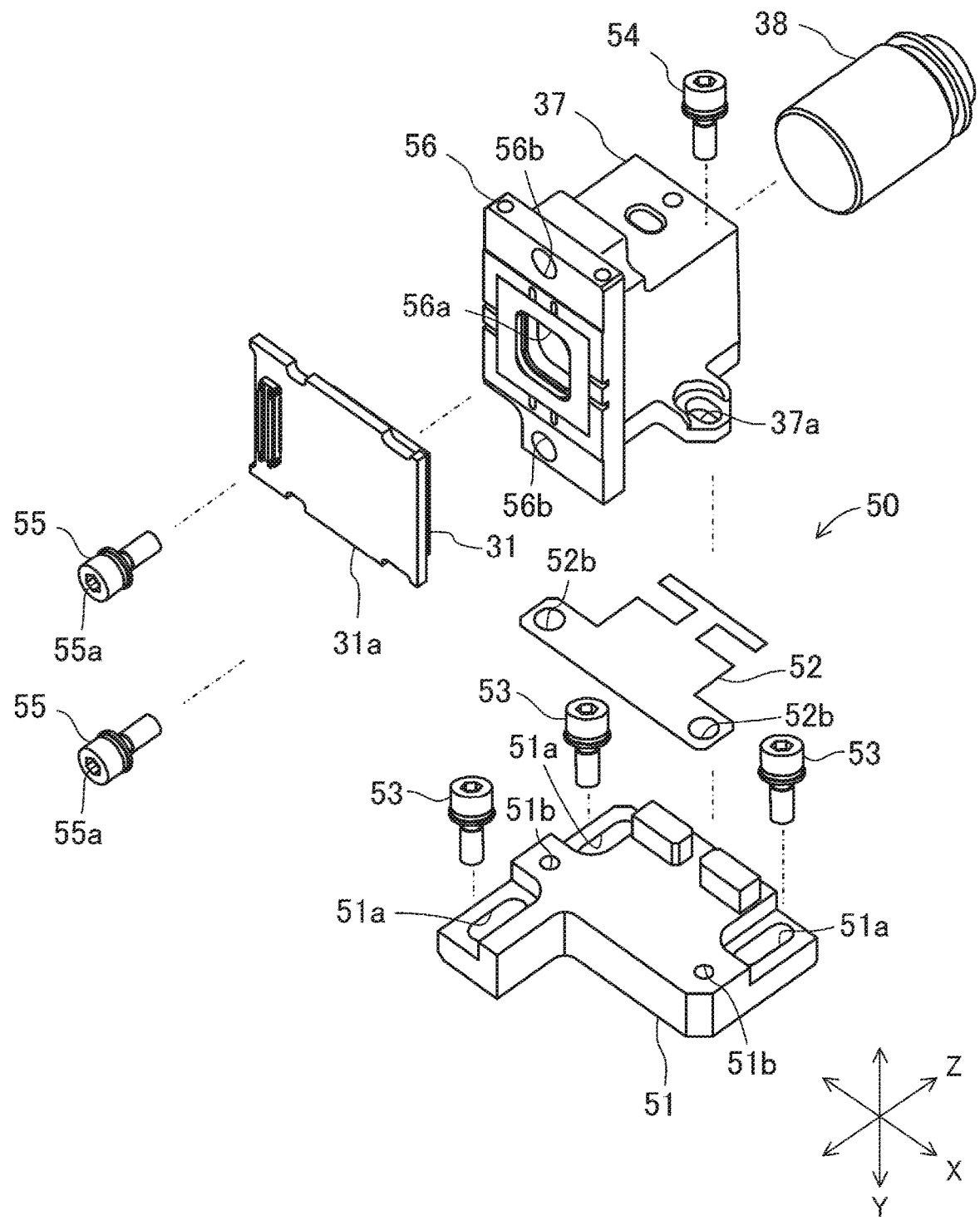
FIG. 10 is an exploded perspective view of the imaging element holder.

As shown in FIG. 10, the adjusting mechanism 50 is provided with a housing side adjusting member 51, a shim 52, a housing side screw 53, a holder side screw 54, and an imaging element side screw 55. The axis direction of the housing side screw 53 and the axis direction of the holder side screw 54 are matched, and it is Y-direction. Further, the axis direction of the imaging element side screw 55 is orthogonal to the axis direction of the housing side screw 53, and it is Z-direction. The number of each of the screws 53, 54, 55 can be arbitrarily set.

The housing side adjusting member 51 is the plate member extending along the inner surface of the side wall of the light receiving housing 40. In the peripheral edge part of the housing side adjusting member 51, three elongated holes 51a which are elongated in the Z-direction are formed with an interval in the X-direction and the Y-direction each other. On the inner surface of the side wall of the light receiving housing 40, the screw holes (not shown) are formed in the places corresponding to the elongated holes 51a. When the housing side screws 53 are inserted into the elongated holes 51a of the housing side adjusting member 51 and screwed in the screw holes of the light receiving housing 40, the housing side adjusting member 51 can be fastened and fixed to the light receiving housing 40. When the housing side screws 53 are fastened, it can be the fixed state in which the housing side adjusting member 51 is fixed to the light receiving housing 40, and on the other hand, when the housing side screws 53 are loosened, it can be the unfixed state in which the housing side adjusting member 51 can be displaced in the Z-direction with respect to the light receiving housing 40.

The shim 52 is the member arranged between the housing side adjusting member 51 and the imaging element holder 37, and it can be provided as needed. By changing the thickness or the number of the shim 52, it is possible to position-adjust the two-dimensional imaging element 31 in the Y-direction.

In the imaging element holder 37, two of the elongated holes 37a which are elongated in the X-direction are formed with an interval in the X-direction to each other (see only one is shown in FIGS. 9 and 10). In the shim 52, the insertion holes 52b are formed in the places corresponding to the elongated holes 37a. Further, in the housing side adjusting member 51, the screw holes 51b are formed in the places corresponding to the elongated holes 37a. When the holder side screws 54 are inserted through the elongated holes 37a of the imaging element holder 37 and the insertion holes of the shim 52 and are screwed to the screw holes 51b of the housing side adjusting member 51, the imaging element holder 37 can be fastened and fixed to the housing side adjusting member 51. When the holder side screws 54 are fastened, it can be the fixed state in which the imaging element holder 37 is fixed to the housing side adjusting member 51, and on the other hand, when the holder side screws 54 are loosened, it can be the unfixed state in which the imaging element holder 37 can be displaced in the X-direction with respect to the housing side adjusting member 51.

The adjusting mechanism 50 is further provided with an imaging element fixing member 56 in which the two-dimensional imaging element 31 is fixed. The imaging element fixing member 56 is separated from the imaging element holder 37, and it is arranged between the imaging element holder 37 and the two-dimensional imaging element 31. As shown in FIG. 10, in the imaging element fixing member 56, a through hole 56a is formed, and it is configured not to prevent the light from reaching the two-dimensional imaging element 31. In the both sides in the Y-direction of the imaging element fixing member 56, an adjustment hole 56b is formed. The adjustment hole 56b has an elongated shape in the X-direction, and further, it is largely formed in the Y-direction. A screw hole (not shown) is formed in the places corresponding to the adjustment holes 56b. When the imaging element side screws 55 are inserted through the adjustment holes 56b of the imaging element fixing member 56 and are screwed in the screw holes of the imaging element holder 37, the imaging element fixing member 56 can be fastened and fixed to the imaging element holder 37. When the imaging element side screws 55 are fastened, it can be fixed to the light receiving housing 40 via the imaging element fixing member 56, the imaging element holder 37, and the housing side adjusting member 51. On the other hand, when the imaging element side screws 55 are loosened, the two-dimensional imaging element 31 can be displaced in the X-direction and the Y-direction with respect to the light receiving housing 40, and it can be rotated in the θ-direction. That is, the imaging element side screws 55 are the fixing tool which switches from the fixed state in which the two-dimensional imaging element 31 is fixed to the light receiving housing 40, and the unfixed state in which the two-dimensional imaging element 31 can be displaced with respect to the light receiving housing 40.

As shown in FIG. 7, the head part of the imaging element side screws 55 is arranged to project obliquely downward. In the head part of the imaging element side screws 55, the tool engagement part 55a (shown in FIG. 9) engaging with a tool 200 (shown in FIG. 7) of hexagon wrench or driver, socket, etc. is provided. The tool engagement parts 55a can be configured with a hole or a recess, etc. in which the tip end part of the tool 200 is inserted. Further, the imaging element side screw 55 may be configured by a hexagon head bolt, etc.

On the bottom surface (surface different from the surface on which the introducing opening 41 is formed), the access openings 46, 46 for accessing the imaging element side screws 55, 55 of the adjusting mechanism 50 from the outside of the light receiving housing 40 are formed. The interval between the access openings 46, 46 is set to be equal to the interval between the imaging element side screws 55, 55. When extending the axial line of the imaging element side screw 55 downward, at the place where the axial line intersects with the bottom surface of the light receiving housing 40, the access opening 46 is positioned. The access opening 46 is the communication port communicating the inside and outside of the light receiving housing 40 by penetrating through the light receiving housing 40. Accordingly, the access opening 46 can access to the imaging element side screw 55 from the direction which is almost orthogonal to the imaging face of the two-dimensional imaging element 31.

The dimension of the access opening 46 is set in order to insert the tip end part of the tool 200 into the light receiving housing 40. Further, since the access opening 46 is positioned on the extended line of the axial line of the imaging element side screw 55, by only inserting the tip end part of the tool 200 into the inside of the light receiving housing 40 from the access opening 46, it can be engaged to the tool engagement part 55a of the imaging element side screw 55. Accordingly, the access opening 46 may be called as a guide opening which guides the tip end part of the tool 200 to the tool engagement part 55a of the imaging element side screw 55. By forming the access opening 46, without viewing the imaging element side screw 55 by a worker, the imaging element side screw 55 can be loosened and fastened by the tool 200.

As shown in FIG. 8A, in the light receiving housing 40, as the sealing member for sealing the access opening 46 or the closing member for closing the access opening 46, the screw 47 and the sealing material 48 are provided. The sealing material 48 is configured to include, for example, an elastic of a rubber, etc. by the member having waterproof, and is configured to seal the inner circumferential surface of the access opening 46 over whole periphery. The screw 47 is screwed to the screw groove (not shown) formed on the inner circumferential surface of the access opening 46. The screw 47 and the sealing material 48 may be integrated. The screw 47 and the sealing material 48 come outside from the access opening 46, so that it is possible to perform the operation of the imaging element side screw 55 by the tool 200 by opening the access opening 46. On the other hand, by sealing the access opening 46 by the screw 47 and the sealing material 48, the waterproofness and the dustproofness can be secured. Note that the access opening 46 may be sealed by only the screw 47, and the access opening 46 may be sealed by the member, for example, a cap.

Figure 14:
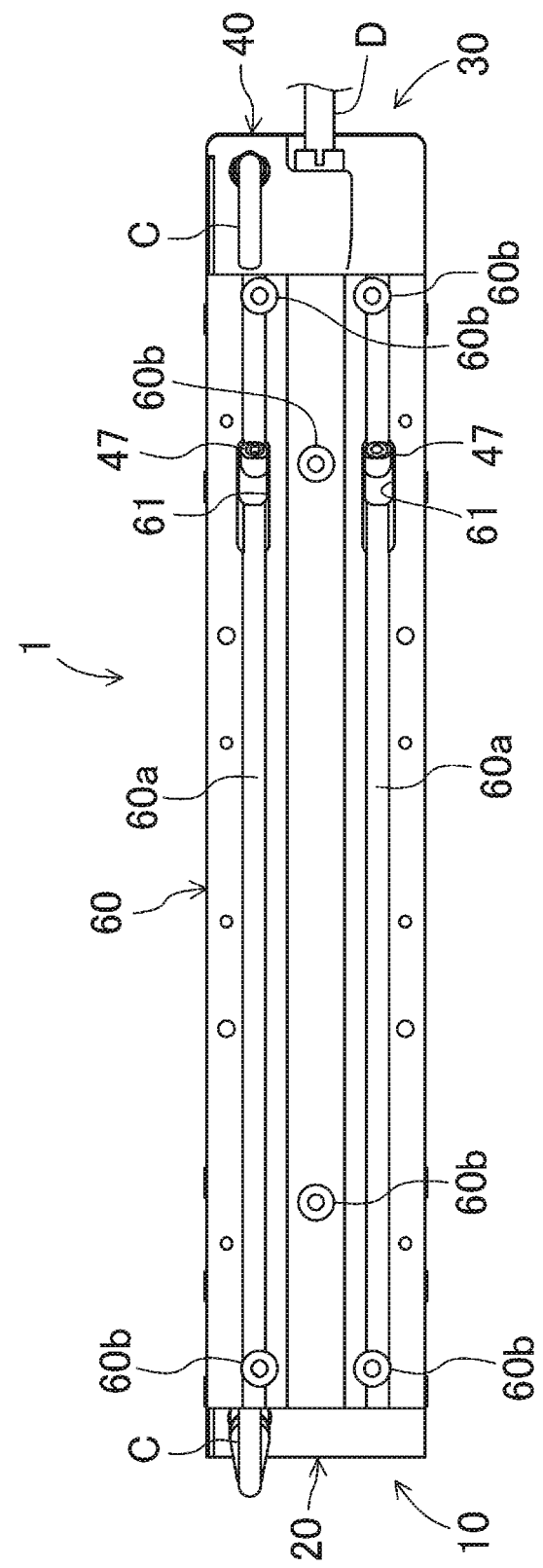
FIG. 14 is a bottom surface view in a case in which the light projection unit and the light receiving unit are used by fixing it to the fixing member.

In the case of the embodiment shown in FIGS. 2 and 3, that is, the embodiment using the fixing member 60, as shown in FIG. 14, in the fixing member 60, the through hole 61 communicating with the access opening 46 can be formed in the position corresponding to the access opening 46 formed in the light receiving housing 40 fixed to the fixing member 60. The through hole 61 may be an elongated hole which is elongated in the longitudinal direction of the fixing member 60. The diameter of the through hole 61 is large enough to insert the tool 200.

The structure or the shape of the fixing member 60 is not particularly limited, but in the present embodiment, on the bottom surface of the fixing member 60, two grooves 60a, 60a are formed with an interval from each other in the width direction. In this case, the through hole 61 can be opened in the inner part of the groove 60a.

(Adjustment by Adjusting Mechanism)

Next, the adjustment using the adjusting mechanism 50 which is configured as described above will be described. When the holder side screw 54 is only loosened and the imaging element holder 37 is displaced in the X-direction with respect to the housing side adjusting member 51, the parallelism of the optical axis with respect to the bottom part reference surface 40c of the light receiving housing 40 can be adjusted. Further, when the two-dimensional imaging element 31 is displaced in the Y-direction by changing the thickness or the number of the shim 52, the parallelism of the optical axis with respect to the side reference surface 40a of the light receiving housing 40 can be adjusted.

When the housing side adjusting member 51 is displaced in the Z-direction with respect to the light receiving housing 40 by loosening only the housing side screw 53, it is possible to perform the working distance adjustment (focus adjustment) with respect to the working distance reference surface 40d (shown in FIG. 3). In other words, when the light receiving side lens unit 38 is displaced in the Z-direction with respect to the substrate 31a, the working distance can be adjusted. Further, when the imaging element holder 37 in which the two-dimensional imaging element 31 is fixed is moved in the separating direction with respect to the light projection unit 10, the telecentricity of the optical system can be adjusted.

Further, when accessing the imaging element side screws 55 from the outside by the tool 200 and loosening the imaging element side screws 55, the two-dimensional imaging element 31 can be displaced in the X-direction and the Y-direction as shown in FIG. 7, and it can be rotated in the θ-direction. When the two-dimensional imaging element 31 is displaced in the X-direction, the view changes in the X'-direction, and when the two-dimensional imaging element 31 is displaced in the Y-direction, the view changes in the Y'-direction, and when the two-dimensional imaging element 31 is rotated in the θ-direction, the view changes in the θ'-direction.

(Effect of the Embodiments)

As explained above, according to this embodiment, by placing the measurement region S between the light projection housing 20 and the light receiving housing 40, the parallel light projected to the measurement region S from the light projection window 23 of the light projection housing 20 passes through the measurement region S and is made incident to the light receiving side telecentric lens 36 from the light receiving window 43 of the light receiving housing 40. The parallel light incident to the light receiving side telecentric lens 36 is returned at the light receiving side reflector 35 and is received on the imaging face of the two-dimensional imaging element 31. In this time, when the workpiece W is placed in the measurement region S, the image of the workpiece W is imaged on the imaging face of the two-dimensional imaging element 31, and with this, it becomes possible to measure the shape of the workpiece W or the dimension of each part.

In the case in which the light receiving housing 40 is placed, it can be placed by using the reference surfaces 40a, 40c provided on the outer surface of the light receiving housing 40 as a reference. In the placed state, in the case in which the optical axis of the two-dimensional imaging element 31 is shifted, the imaging element side screws 55 can be operated by accessing the imaging element side screws 55 of the adjusting mechanism 50 from the access opening 46 provided in the light receiving housing 40. By operating the imaging element side screws 55, the two-dimensional imaging element 31 can be displaced with respect to the light receiving housing 40 in the unfixed state. With this, the optical axis of the two-dimensional imaging element 31 can be adjusted. After the adjustment, the two-dimensional imaging element 31 can be switched to the fixed state with respect to the light receiving housing 40 by operating the imaging element side screws 55. That is, since the access opening 46, which is separately provided from the introducing opening 41 for inserting the imaging element holder 37 into the inside of the light receiving housing 40 in the state in which the two-dimensional imaging element 31 is held, is formed, the optical axis adjustment of the two-dimensional imaging element 31 is easily performed in the placed state inside the housing 40.

The aforementioned embodiments are in respects merely illustrative and are not to be construed in limiting fashion. All modifications and changes within the range of equivalents of the claims are, moreover, within the scope of the present invention.

INDUSTRIAL APPLICABILITY

As described above, the optical measurement apparatus according to the present invention can be used in the case of measuring the dimension, etc. of the workpiece placed between the light projection housing and the light receiving housing.

What is claimed is:

1. An optical measurement apparatus comprising:
   a light projection unit projecting a parallel light toward a measurement region;
   a light receiving unit placed opposite to the light projection unit side and receiving the parallel light passing the measurement region, and generating an image of a measuring objection placed in the measurement region; and
   a dimension measuring means performing a dimension measurement of the measuring object based on the image generated in the light receiving unit,
   wherein the light receiving unit includes
   a light receiving side telecentric lens in which the parallel light passed through the measurement region is made incident,
   a two-dimensional imaging element receiving the light passed through the light receiving side telecentric lens, and capturing an image of the measuring object in the measurement region for generating an image of the measuring object in the measurement region,
   a light receiving housing having a box-shape in which an introducing opening is formed on one side surface and storing the two-dimensional imaging element, a reference surface as a reference when placing and a housing installation hole for placing via the reference surface being provided on an outer surface which is different from the one side surface, and the light receiving side telecentric lens being mounted on the light receiving housing, an imaging element holder holding the two-dimensional imaging element mounted in an adjustable manner of a position and a posture of the two-dimensional imaging element with respect to an inner surface opposite to the one side surface of the light receiving housing, and a cover closing the introducing opening.

2. The optical measurement apparatus according to claim 1, wherein
the two-dimensional imaging element is mounted on the inner surface of the light receiving housing via an adjusting mechanism capable of adjusting the position and the posture of the two-dimensional imaging element and the imaging element holder,
the adjusting mechanism has a fixing tool switching between a fixed state in which the two-dimensional imaging element is fixed to the light receiving housing, and a unfixed state in which the two-dimensional imaging element is capable of being displaced with respect to the light receiving housing, and
a first access opening for accessing the fixing tool of the adjusting mechanism from an outside of the light receiving housing is formed on a surface which is different from a surface forming the introducing opening in the light receiving housing.

3. The optical measurement apparatus according to claim 2, wherein
the first access opening is accessibly formed to the fixing tool from a direction approximately orthogonal to an imaging face of the two-dimensional imaging element.

4. The optical measurement apparatus according to claim 2, further comprising:
a fixing member detachably fixing the light projection housing and the light receiving housing in a manner that the light projection unit and the light receiving unit are faced from each other,
wherein in the fixing member, a through hole communicating the first access opening is formed at a position corresponding to the first access opening formed in the light receiving housing fixed to the fixing member.

5. The optical measurement apparatus according to claim 1, wherein
the light receiving housing further includes a receiving window on a front surface of the light receiving housing and receiving the parallel light passed through the measurement region to an inside, and
the light receiving side telecentric lens is mounted in the light receiving window.

6. The optical measurement apparatus according to claim 1, further comprising:
a first seat for mounting the light receiving side telecentric lens formed in the light receiving housing,
wherein the light receiving side telecentric lens is fixed to the first seat.

7. The optical measurement apparatus according to claim 6, further comprising:
a lens energizing member energizing the light receiving side telecentric lens in a direction pressing to the first seat.

8. The optical measurement apparatus according to claim 1, wherein
in the light receiving housing, further, a reflector for returning light passed through the light receiving side telecentric lens and guiding to the two-dimensional imaging element is mounted, and
each of the light receiving side telecentric lens and the reflector is fixedly mounted to the light receiving housing.

9. The optical measurement apparatus according to claim 1, wherein
in the light receiving housing, a second seat for mounting the reflector to return the light passed through the light receiving side telecentric lens and guide to the two-dimensional imaging element is formed.

10. The optical measurement apparatus according to claim 9, further comprising:
a reflector energizing member energizing in a direction of pressing the reflector to the second seat.

11. The optical measurement apparatus according to claim 9, wherein
on a surface which is different from a surface forming the introducing opening in the light receiving housing, a reflector mounting hole fitting the reflector is formed,
the second seat is configured by a projection projecting radially inward from the inner circumferential surface of the reflector mounting hole, and
a cover covering the reflector mounting hole from the outside of the light receiving housing is mounted in the light receiving housing.

12. The optical measurement apparatus according to claim 9, wherein
the imaging element holder has a light receiving side lens unit, which is arranged between the reflector and the two-dimensional imaging element, in which the light reflected by the reflector is made incident and the incident light is emitted to the two-dimensional imaging element, and
the light receiving side telecentric lens and the light receiving side lens unit form both side telecentric optical system.

13. An optical measurement apparatus comprising:
a light projection unit projecting a parallel light toward a measurement region;
a light receiving unit placed opposite to the light projection unit and receiving the parallel light passing the measurement region, and generating an image of a measuring objection placed in the measurement region; and
a dimension measuring means performing a dimension measurement of the measuring object based on the image generated in the light receiving unit,
wherein the light projection unit includes
a light source generating the measurement light projected to the measurement region,
a light projection side telecentric lens in which the measurement light generated by the light source is made incident and the measurement light is converted to the parallel light directed toward the measurement region,
a light projection housing having a box-shape in which an introducing opening is formed on one side surface and storing the light source, a reference surface as a reference when placing and a housing installation hole for placing via the reference surface being provided on an outer surface which is different from the one side surface, and the light projection side telecentric lens being mounted on the light projection housing,
a light source holder holding the light source mounted in an adjustable manner of a position and a posture of the light source with respect to an inner surface opposite to the one side surface of the light projection housing, and
a cover closing the introducing opening.

14. The optical measurement apparatus according to claim 13, wherein
- the light source is mounted on the inner surface of the light projection housing via the light source holder capable of adjusting the position and the posture of the light source, and
- a second access opening for accessing the light source holder from an outside of the light projection housing is formed on a surface which is different from a surface forming the introducing opening in the light projection housing.

15. The optical measurement apparatus according to claim 13, wherein
- the light projection housing further includes a light projection window on the front surface of the light projection housing and passing the parallel light which is projected toward the measurement region, and
- the light projection side telecentric lens is mounted in the light projection window.

16. The optical measurement apparatus according to claim 13, wherein
- a third seat for mounting the light projection side telecentric lens formed in the light projection housing,
- wherein the light projection side telecentric lens is fixed to the third seat.

17. The optical measurement apparatus according to claim 16, further comprising:
- a lens energizing member energizing the light projection side telecentric lens in a direction pressing to the third seat.

18. The optical measurement apparatus according to claim 13, wherein
- in the light projection housing, further, a reflector for returning the measurement light from the light source and guiding to the light projection side telecentric lens is mounted, and
- each of the light projection side telecentric lens and the reflector is fixedly mounted to the light projection housing.

19. The optical measurement apparatus according to claim 13, wherein
- in the light projection housing, a fourth seat for mounting the reflector to return the measurement light from the light source and guiding to the light projection side telecentric lens is formed.

* * * * *